US007272516B2

(12) United States Patent
Wang et al.

(10) Patent No.: US 7,272,516 B2
(45) Date of Patent: Sep. 18, 2007

(54) FAILURE RATE ADJUSTMENT FOR ELECTRIC POWER NETWORK RELIABILITY ANALYSIS

(75) Inventors: Zhenyuan Wang, Apex, NC (US); Jiuping Pan, Raleigh, NC (US); David Lubkeman, Cary, NC (US); Richard E. Brown, Cary, NC (US)

(73) Assignee: ABB Research, Zurich (CH)

( * ) Notice: Subject to any disclaimer, the term of this patent is extended or adjusted under 35 U.S.C. 154(b) by 64 days.

(21) Appl. No.: 10/745,122

(22) Filed: Dec. 23, 2003

(65) Prior Publication Data

US 2004/0167731 A1    Aug. 26, 2004

Related U.S. Application Data

(60) Provisional application No. 60/436,308, filed on Dec. 23, 2002.

(51) Int. Cl.
    *G01R 21/00* (2006.01)
(52) U.S. Cl. .................................................. 702/60
(58) Field of Classification Search ................ 702/60, 702/64, 58, 57
    See application file for complete search history.

(56) References Cited

U.S. PATENT DOCUMENTS

| 5,107,497 | A | 4/1992 | Lirov et al. |
| 5,699,403 | A | 12/1997 | Ronnen |
| 5,798,939 | A | 8/1998 | Ochoa et al. |
| 6,041,287 | A | 3/2000 | Dister et al. |
| 6,167,352 | A | 12/2000 | Kanevsky et al. |
| 6,321,187 | B1 * | 11/2001 | Squier et al. ................. 703/18 |
| 6,330,935 | B1 | 12/2001 | Systermans |
| 6,671,634 | B2 * | 12/2003 | Koutlev et al. ............... 702/60 |
| 2002/0078403 | A1 * | 6/2002 | Gullo et al. ................... 714/37 |

OTHER PUBLICATIONS

Kuntz, P.A., "Optimal reliability centered vegetation maintenance scheduling in electric power distribution system", *Ph.D. Thesis of UOW*, 1999.
Radmer, D.T., "Predicting Vegetation-Related Failure Rates in Electric Power Distribution System", *Master Thesis of UOW*, 1999, 61 pages.
Chow, M. et al., "Analysis and Prevention of Animal-Caused Faults in Power Distribution System", *IEEE Transactions On Power Delivery*, 1995, 10(2), 995-1001.
Frazier, S.D., "Suggested Practices for Reducing Animal-Caused Outages", *IEEE Industry Application Magazine*, Jul./Aug. 1996, 25-31.

(Continued)

*Primary Examiner*—Michael Nghiem
*Assistant Examiner*—Demetrius R. Pretlow
(74) *Attorney, Agent, or Firm*—Paul R. Katterle; Woodcock Washburn LLP

(57) ABSTRACT

Methodologies adjust a component failure rate for electric power network reliability analysis. A component may include subcomponents and the failure of each subcomponent may be feature dependent. Features are measurable or observable inputs, which can affect the life of one or more subcomponents. The failure rate of a particular component may be obtained according to its real conditions. The methodologies can be used to do condition-based reliability analysis for electric power networks, in order to obtain a maintenance/replacement/operation strategy.

20 Claims, 16 Drawing Sheets

OTHER PUBLICATIONS

*IEEE Guide for Improving the Lighting Performance of Electric Power Overhead Distribution Lines,* 1410-1997, Approved Jun. 26, 1997, 44 pages.

Tolbert, L.M., et al., "Reliability of Lightning Resistant Overhead Distribution Lines", *IEEE I & CPS,* May 1999, 147-152.

Short, T.A., "Lightning Protection of Overhead Distribution Lines", http://www.pti-us.com/pti/consult/lightning protection of overhead. htm, Sep. 14, 2001, 9 page.

Short, T.A., "Monitoring Results of the Effectiveness of Surge Arrester Spacings on Distribution Line Protection", http://www.pti-us.com/pti/consult/lico.htm, Sep. 14, 2001, 12 pages.

"Electric Power Industry Applications of Lightning Data", *Global Atmospherics Lightning Detection,* http://www.glatmos.com/industries.article1.html, Sep. 17, 2001, 7 pages.

"Working Group Report: Calculating the Lightning Performance of Distribution Lines", *IEEE Transactions on Power Delivery,* 1990, 5(3), 1408-1417.

*IEEE Recommended Practice for the Design of Reliable Industrial and Commercial Power Systems* (Gold Book), IEEE Std 493-1997, Approved Dec. 16, 1997, 502 pages.

Horton, W.F., et al., "The failure rates of overhead distribution system components", *IEEE,* 1991, 713-717.

Horton, W.F., et al., "Determination of Failure Rates of Underground Distribution System Components from Historical Data", *IEEE,* 1991, 718-723.

Stember, L.H., et al., "Analysis of Filed Failure Data on HMWPE and XLPE Insulated High-Voltage Distribution Cable", *IEEE Trans on Power Apparatus,* 1985, vol. PAS-104(8), 1979-1985.

Cizelj, R.J., et al., "Component Reliability Assessment Using Quantitative and Qualitative Data", *Reliability Engineering and System Safety,* 2001, 71, 81-95.

Gupta, S., et al., "Predicting the Failure Rates of Overheard Distribution Lines Using an Adaptive-Fuzzy Technique", 2001, 1-5.

Lang, B.P., "Power Distribution System Reliability Planning Using a Fuzzy Knowledge-Based Approach", *IEEE Trans, on Power Delivery,* Jan. 2000, 15(1), 279-284.

"IEEE Guide for Failure Investigation, Documentation and Analysis for Power Transformers and Shunt Reactors", *IEEE Standards Board,* 1992, C57, 125-1991.

Frimpong, G.K., "Facilities Assessment Management Engineering(An Overview)", *ABB Internal Report,* Jun. 9, 2000, 19 pages.

Canadian Electricity Association 2000 Annual Service Continuity Report on Distribution System Performance in Electrical Utilities, May 2001, 1-78.

Canadian Electricity Association, Forced Outage Performance of Transmission Equipment- for the period Jan. 1, 1994 to Dec. 31, 1998, Feb. 2000, 1-142.

Wang, Z., "Artificial Intelligence Applications in the Diagnosis of Power Transformer Incipient Faults", *Virginia Tech, Ph.D., dissertation,* Aug. 2000, 1-105.

Densley, J., "Ageing Mechanisms and Diagnostics for Power Cables- An Overview", *IEEE Electrical Insulation Magazine,* Jan./Feb. 2001, 17(1), 14-22.

Marsden, H. et al., "Cable Diagnostics Business Technology Evaluation", *ABB ETI Technical Report,* # BDC-R-01002, Jan. 2001, 1-66.

Morrison, W.G., "Using New Technology to Improve Reliability of an Industrial Cable Distribution System", *IEEE Trans. On Industry Applications,* Mar./Apr. 1992, 28(2), 275-281.

Pultrum, E. et al., "Dutch Distribution Cable Performance", *IEEE Colloquium on "MV Paper Cables: Asset or Liability"?* Capenhurst , Apr. 21, 1998, 3/1 thru 3/6.

Brown, R.E., "Probabilistic Reliability and Risk Assessment of Electric Power Distribution Systems", *DistribuTECH Conference,* San Diego, Ca, Feb. 2001.

Brown, R.E., "Modeling the Impact of Substations on Distribution Reliabilty", *IEEE Transactions on Power Systems,* Feb. 1999, 14(2), 349-354.

Carvalho, A. et al., "Functional Specification as Driver for Technical/Economical Optimisation of Substation", *Presentation at CIGRE Session,* Paris, France, 2000, 1-10.

Beshir, M.J. et al., "Comparison of Monte Carlo Simulation and State Enumeration Based Adequacy Assessment Programs: Cream and Comrel", *IEEE,* 1996, 438-444.

Van Casteren, J.F.L. et al., "Reliability Assessment in Electrical Power Systems: The Weibull-Markov Stochastic Model", *IEEE Transactions on Industry Applications,* May/Jun. 2000, 36(3), 911-915.

McDermott, T.E. et al., "Lightning Protection of Distribution Lines", *IEEE Transactions on Power Delivery,* Jan. 1994, 9(1), 138-152 (Previously submitted as Reference #10 in IDS dated Nov. 3, 2004).

Volkmann, C.A. et al., "A Probabilistic Approach to Distribution System Reliability Assessment", *Third International Conference on Probabilistic Methods Applied to Electric Power Systems,* Jul. 3-5, 1991, 169-173 (Previously submitted as Reference # 13 in IDS dated Nov. 3, 2004).

* cited by examiner

| CB FR Estimation Model | | | Data Source: Canadian Survey | | | | | | | | |
|---|---|---|---|---|---|---|---|---|---|---|---|
| Back | | | CB Type: All Type | | | | | | | | |
| Feature | | | Factor | | | | Factor Related FRs | | | WF | Weighted |
| Name | Assessment | | Value | Name | WSF | Value | Multiplier | FR Mean | Est. FR | | FRs |
| Age | 26-30 | | 5 | Bushing (including CTs) | 0.95 | 0.5225 | 1.0432 | 0.0014 | 0.0015 | 1 | 0.0015 |
| Breaker type | Bulk Oil | | 5 | Operating Mechanisms | 0.95 | 0.494 | 0.9888 | 0.0186 | 0.0184 | 1 | 0.0184 |
| Operation experience | Minor problems (i.e. leakage) | | 6 | Interrupters | 0.95 | 0.532 | 1.0621 | 0.0003 | 0.0003 | 1 | 0.0003 |
| Breaking occurrence | 2-5 | | 6 | Insulation System (Support) | 0.95 | 0.57 | 1.1414 | 0.0028 | 0.0032 | 1 | 0.0032 |
| Switching occurrence | 50-100 | | 6 | Resistors or Grounding | 0.95 | 0.5225 | 1.0432 | 0.0001 | 0.0001 | 1 | 0.0001 |
| Driving mechanism | Hydraulic-spring | | 4 | Interrupting Medium | 0.95 | 0.551 | 1.1009 | 0.0025 | 0.0028 | 1 | 0.0028 |
| Maintenance | 13-18 months | | 4 | Auxiliary Equipment | 0.95 | 0.4655 | 0.9371 | 0.0066 | 0.0062 | 1 | 0.0062 |
| Environment conditions | Moderate air pollution | | 6 | Other | 0.95 | 0.4655 | 0.9371 | 0.0033 | 0.0031 | 1 | 0.0031 |
| Deviation of switching time | 10-20% | | 6 | Control and Protection | 0.95 | 0.5035 | 1.0066 | 0.0277 | 0.0279 | 1 | 0.0279 |
| Synchronism | 2-4 ms | | 4 | | | | | Final Est. FR. | | | 0.0635 |
| Deviation of contact travel | Minor deviation (within tolerable limits) | | 6 | | Multiplier Setting | | | | | | |
| Gas/Oil analysis | Nominal value met | | 6 | | 0~3.5 | | | | | | |
| Operation time of driving motor | 10-20% | | 4 | | | | | | | | |
| Motor drive | Tolerable wear and tear | | 6 | | | | | | | | |
| Control and auxiliary circuits | Minor problems | | 6 | | | | | | | | |
| Arcing chamber | Minor problems | | 6 | | | | | | | | |

Figure 13

OHL FR Estimation Model 2

Data Source: SDG&E OMS Statistics (K State)

| Feature | | Factor | | | Factor Related FRs | | | WF | Weighted |
|---|---|---|---|---|---|---|---|---|---|
| Name | Assessment | Value Name | WSF | Value | Multiplier | FR_Mean | Estimated FR | | FRs |
| Age | 26-30 | 5 Equipment | 0.95 | 0.485 | 0.9713 | 0.0513 | 0.0499 | 1 | 0.0499 |
| Animal population | Normal | 5 Foreign Object | 0.95 | 0.466 | 0.9371 | 0.0140 | 0.0131 | 1 | 0.0131 |
| Animal guards | Standard | 4 Human Error | 0.95 | 0.475 | 0.9541 | 0.0154 | 0.0147 | 1 | 0.0147 |
| OHL location | Small Town | 6 Lightning | 0.95 | 0.513 | 1.0247 | 0.0090 | 0.0092 | 1 | 0.0092 |
| OHL shielding | Moderately | 5 Other | 0.95 | 0.523 | 1.0432 | 0.0064 | 0.0067 | 1 | 0.0067 |
| Lightning protection | Standard | 5 Tree Contact | 0.95 | 0.418 | 0.8562 | 0.0264 | 0.0226 | 1 | 0.0226 |
| Tree density | 15-30 | 5 Unknown | 0.95 | 0.523 | 1.0432 | 0.0259 | 0.0271 | 1 | 0.0271 |
| Tree trimming | 12-24 months | 4 Weather | 0.95 | 0.38 | 0.7952 | 0.0497 | 0.0395 | 1 | 0.0395 |
| Conductor size | 0.6-0.9 | 4 | | | | | Final estimated FR: | | 0.1827 |
| Spacing of conductors | Design standards met | 4 | | | | | | | |
| Pole and structure | Design standards met | 4 | | | Multiplier Setting: | | | | |
| Barriers | Standard | 4 | | | 0~3.5 | | | | |
| Environment conditions | Moderate air pollution | 6 | | | | | | | |
| O&M experience | Good | 6 | | | | | | | |

Figure 14a

OHL FR Estimation Model 2

Data Source: SDG&E OMS Statistics (K State)

| Feature | | Factor | | | Factor Related FRs | | | WF | Weighted |
|---|---|---|---|---|---|---|---|---|---|
| Name | Assessment | Value Name | WSF | Value | Multiplier | FR_Mean | Estimated FR | | FRs |
| Age | >40 | 10 Equipment | 0.95 | 0.893 | 2.5395 | 0.0513 | 0.1304 | 1 | 0.1304 |
| Animal population | Excessive | 10 Foreign Object | 0.95 | 0.608 | 1.2282 | 0.0140 | 0.0172 | 1 | 0.0172 |
| Animal guards | Standard | 4 Human Error | 0.95 | 0.808 | 1.9185 | 0.0154 | 0.0296 | 1 | 0.0296 |
| OHL location | Small Town | 6 Lightning | 0.95 | 0.57 | 1.1414 | 0.0090 | 0.0102 | 1 | 0.0102 |
| OHL shielding | Moderately | 5 Other | 0.95 | 0.95 | 3.4337 | 0.0064 | 0.0220 | 1 | 0.0220 |
| Lightning protection | Some Sort of | 8 Tree Contact | 0.95 | 0.646 | 1.3243 | 0.0264 | 0.0350 | 1 | 0.0350 |
| Tree density | 31-50 | 8 Unknown | 0.95 | 0.95 | 3.4337 | 0.0259 | 0.0891 | 1 | 0.0891 |
| Tree trimming | 25-36 months | 7 Weather | 0.95 | 0.608 | 1.2282 | 0.0497 | 0.0610 | 1 | 0.0610 |
| Conductor size | 0.6-0.9 | 4 | | | | | Final estimated FR: | | 0.3944 |
| Spacing of conductors | Inadequate (minor) | 7 | | | | | | | |
| Pole and structure | Inadequate (minor) | 7 | | | Multiplier Setting: | | | | |
| Barriers | Some Sort of | 7 | | | 0~3.5 | | | | |
| Environment conditions | Heavy air pollution | 10 | | | | | | | |
| O&M experience | Not good | 10 | | | | | | | |

Figure 14b

FAILURE RATE ADJUSTMENT FOR ELECTRIC POWER NETWORK RELIABILITY ANALYSIS

CROSS-REFERENCE TO RELATED APPLICATIONS

This application claims priority of U.S. Provisional Application Ser. No. 60/436,308 entitled "Failure Rate Adjustment Method for Electric Power Network Reliability Analysis," filed Dec. 23, 2002. This application is related to co-pending U.S. patent application Ser. No. 10/744,743, filed concurrently on Dec. 23, 2003, entitled "Value-Based Transmission Asset Maintenance Management of Electric Power Networks", which is hereby incorporated by reference in its entirety.

FIELD OF THE INVENTION

The invention relates generally to reliability assessment of an electric power network and more particularly to a system and method for failure rate adjustment for power network reliability assessment.

BACKGROUND OF THE INVENTION

Typical power networks include individual components such as circuit breakers, disconnectors, grounding switches, tie breakers, potential transformers (PT), current transformers (CT), power transformers, overhead lines, underground cables, and the like. An individual component typically handles one function for the power network. The term power network is defined herein as a system having components for transmission and/or distribution of electrical power and includes any portion of the entire power network. For example, the power network may be an entire power transmission and distribution system, a substation, a plurality of substations, a section of a transmission line, a section of a distribution line, and the like.

To determine the reliability of the power network, reliability parameters are typically determined for each of the individual components. To quantify the frequency and the amount of time that a component is expected to be unavailable in the power network (e.g., due to a failure or maintenance), a reliability assessment may be performed to calculate some reliability measure for each component in the power network. For example, a reliability assessment system may calculate, for each component a total outage frequency (e.g., the expected number of times that a component will be de-energized per year). The total outage frequency may include a component failure rate (e.g., the expected number of times that a component will be de-energized due to a component fault, the probability of component failure in a given time period, and the like), a self maintenance outage frequency (e.g., the expected number of times that a component will be de-energized due to a maintenance of that component), another maintenance frequency (e.g., the expected number of times that a component will be de-energized due to maintenance of another component), and the like. These reliability parameters may be determined through data mining, processing historical equipment failures (e.g., via failure records, utility outage management systems), and the like.

Current systems for reliability analysis, however, treat all components of the same type as having the same reliability parameters, regardless of the component's condition. The condition of a component may have a great effect on the failure rate of a component. For example, a component that has been well maintained is probably not as likely to fail as a component that has been completely neglected. By ignoring such factors, conventional reliability assessments may yield inaccurate results. Other component conditions, such as, for example, environmental and operational conditions are not considered by conventional systems. Moreover, many components include a large variety of subcomponents, each which can affect the failure rate of the overall component. Each of these subcomponents may have been maintained differently and have a different condition. Conventional systems do not address these factors either. With the recent deregulation of power utilities, accurate reliability assessment of power networks is critical for success in the market.

Many reliability assessment systems rely on failure rates in determining other reliability indices, performing root cause analysis to identify components with the largest impact on failure rates, performing sensitivity analysis to study possible impacts of changes in component failure rates, performing failure risk assessment based on Monte Carlo analysis, and the like. As can be appreciated, determining an accurate failure rate may be very important to many types of reliability assessments.

Therefore, a need exists for a system and method for reliability assessment that can take into consideration the condition of power network components and subcomponents.

SUMMARY OF THE INVENTION

The invention is directed to a system and method for power network reliability assessment with failure rate adjustment.

According to an aspect of the invention, a system and method is provided for performing a reliability assessment of a power network. A method for providing a reliability assessment of a power network includes determining information representative of a failure rate of a power network component based on a population of power network components of the same type as the power network component, receiving information representative of the condition of the power network component, and determining an adjusted failure rate for the power network component based on the information representative of the failure rate of the power network component and the information representative of the condition of the power network component.

The method may also include modifying the adjustment index using a feedback loop and based on historical information of power network component failures.

A system for providing a reliability assessment may include a first data store that includes information representative of a failure rate of a power network component based on a population of power network components of the same type as the power network component and information representative of the condition of the power network component, and a computing application cooperating with the first data store and performing receiving the information representative of a failure rate of a power network component based on a population of power network components of the same type as the power network component from the first data store, receiving the information representative of the condition of the power network component from the first data store, and determining an adjusted failure rate for the power network component based on the information representative of the failure rate of the power network component and the information representative of the condition of the power network component.

The system may include a feedback loop that performs modifying the adjustment index based on historical information of power network component failures.

The information representative of a failure rate of a power network component may be received from a data store containing failure rates of a plurality of power network components, the failure rates being based on a population of power network components of the same type as each power network component, by performing data mining on data representative of failures of a plurality of power network components of the same type as the power network component, by processing historical power network component failure data for a plurality of power network components of the same type as the power network component, and the like.

The information representative of the condition of the power network component may be the age of the power network component, information representative of maintenance performed on the power network component, information representative of preventative maintenance performed on the power network component, information representative of the environment of the power network component, information representative of the operating conditions of the power network component, and the like.

Determining the adjusted failure rate for the power network component may include converting the information representative of the condition of the power network component into an adjustment index, and converting the adjustment index into the adjusted failure rate based on the adjustment index. Converting the information representative of the condition of the power network component into an adjustment index may include transforming the information representative of the condition of the power network component into an adjustment index. Converting the adjustment index into the adjusted failure rate based on the adjustment index may include mapping the adjustment index into the adjusted failure rate based on the adjustment index.

Determining the adjusted failure rate for the power network component may include determining a plurality of subcomponents contributing to the failure rate of the power network component, determining information representative of a failure rate of the power network component based on a population of power network components of the same type as the power network component, determining information representative of the condition of the power network component corresponding to each subcomponent, converting, for each subcomponent, the corresponding information representative of the condition of the power network component into an adjustment index, combining the adjustment indexes; and converting the combined adjustment index into an adjusted failure rate for the power network component based on the combined adjustment index.

Converting the corresponding information representative of the condition of the power network component into an adjustment index may include transforming the corresponding information representative of the condition of the power network component into an adjustment index based on the information representative of the condition of the power network component. Converting the combined adjustment index into the adjusted failure rate may include the combined adjustment index into the adjusted failure rate based on the adjustment index.

These and other features of the invention will be more fully set forth hereinafter.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the several views of the drawings, and wherein:

FIG. 10 is an illustrative screen shot of an illustrative power transformer failure rate model in accordance with an embodiment of the invention;

FIG. 12 is an illustrative screen shot of an illustrative cable failure rate model in accordance with an embodiment of the invention;

FIG. 13 is an illustrative screen shot of an illustrative circuit breaker failure rate model in accordance with an embodiment of the invention;

FIGS. 14a–b are illustrative screen shots of illustrative overhead line failure rate models in accordance with an embodiment of the invention;

DETAILED DESCRIPTION OF ILLUSTRATIVE EMBODIMENTS

Exemplary Power Network

Figure 1:
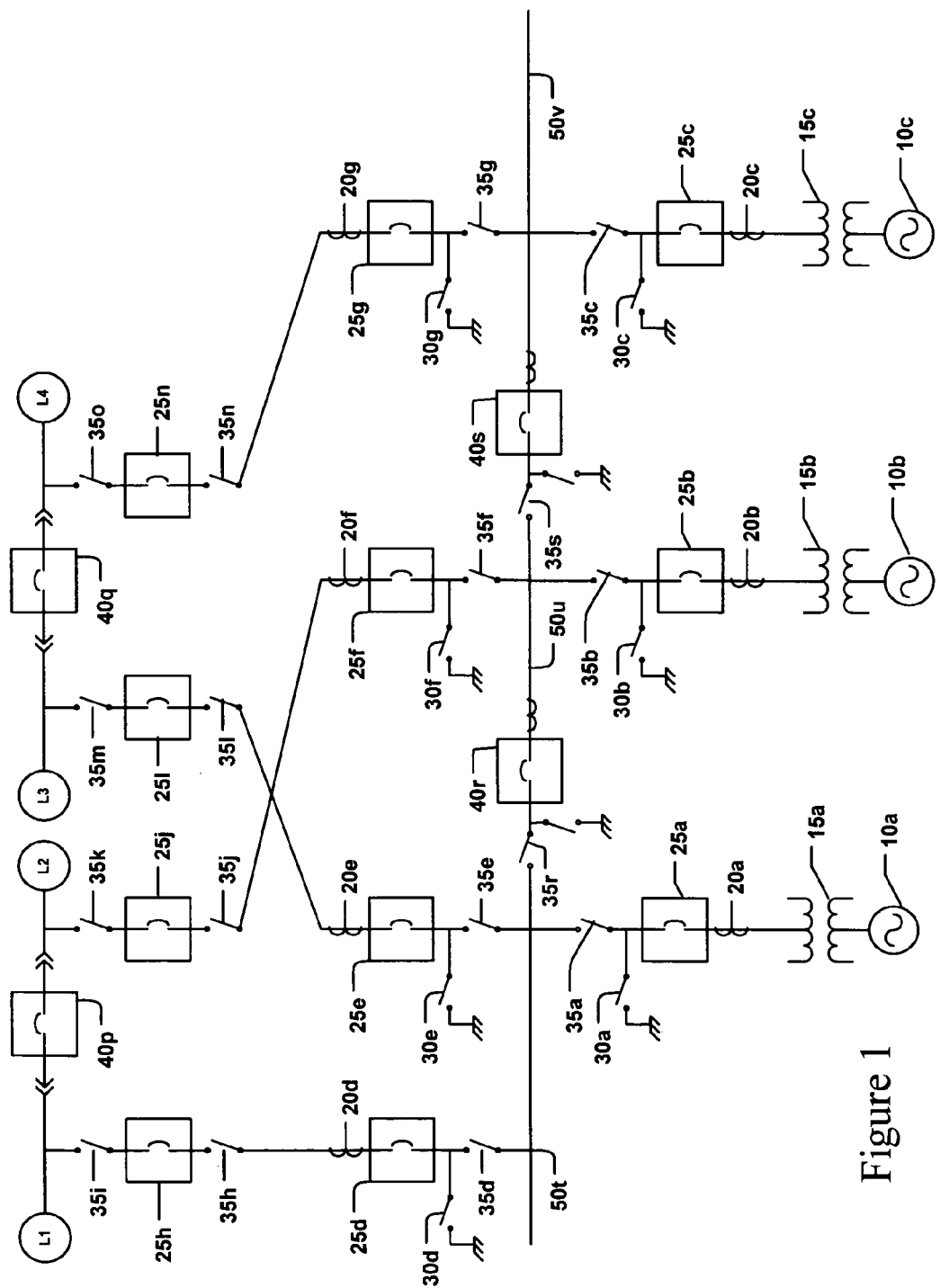
FIG. 1 is a graphical representation of an exemplary power network having individual power network components for which a power network reliability assessment may be determined in accordance with an embodiment of the invention.

FIG. 1 illustrates an exemplary power network having individual components, which may each include subcomponents. As shown in FIG. 1, generators 10a–c are electrically connected to transformers 15a–c, respectively. Transformers 15a–c are electrically connected to circuit breakers 25a–c, respectively, and current transformers (CTs) 20a–c sense current from transformers 15a–c, respectively. Circuit breakers 25a–c are electrically connected to disconnectors 35a–c, respectively, which are in turn electrically connected to bus bar 50t–v, respectively. Grounding switches 30a–c are electrically connected to circuit breakers 25a–c respectively.

Bus bars 50t–v are electrically connected via tie breakers 40r–s, as shown. From bus bars 50, power is distributed to loads L1–L4, again through various circuit breakers 25 and disconnectors 35. Tie breaker 40p may connect loads L1 and L2, and tie breaker 40q may connect loads L3 and L4.

Tie breakers are normally open, but may be closed when reconfiguring a power network in response to a fault or maintenance. Reconfiguration of a power network attempts to power as many loads as possible, given the fault or maintenance on the power network.

Faults are handled on a power network having individual components as follows. If a fault occurs on circuit breaker 25f, power is interrupted with breakers 25b, 25j, 40r, and 40s, then disconnectors 35j and 35f are opened before repair is performed on circuit breaker 25f. Also, the power network may be reconfigured to supply as many loads as possible during component repair. For example, tie breaker 40p may be closed to provide power to load L2 via circuit breaker 25h, while circuit breaker 25f is being repaired.

Figure 2:
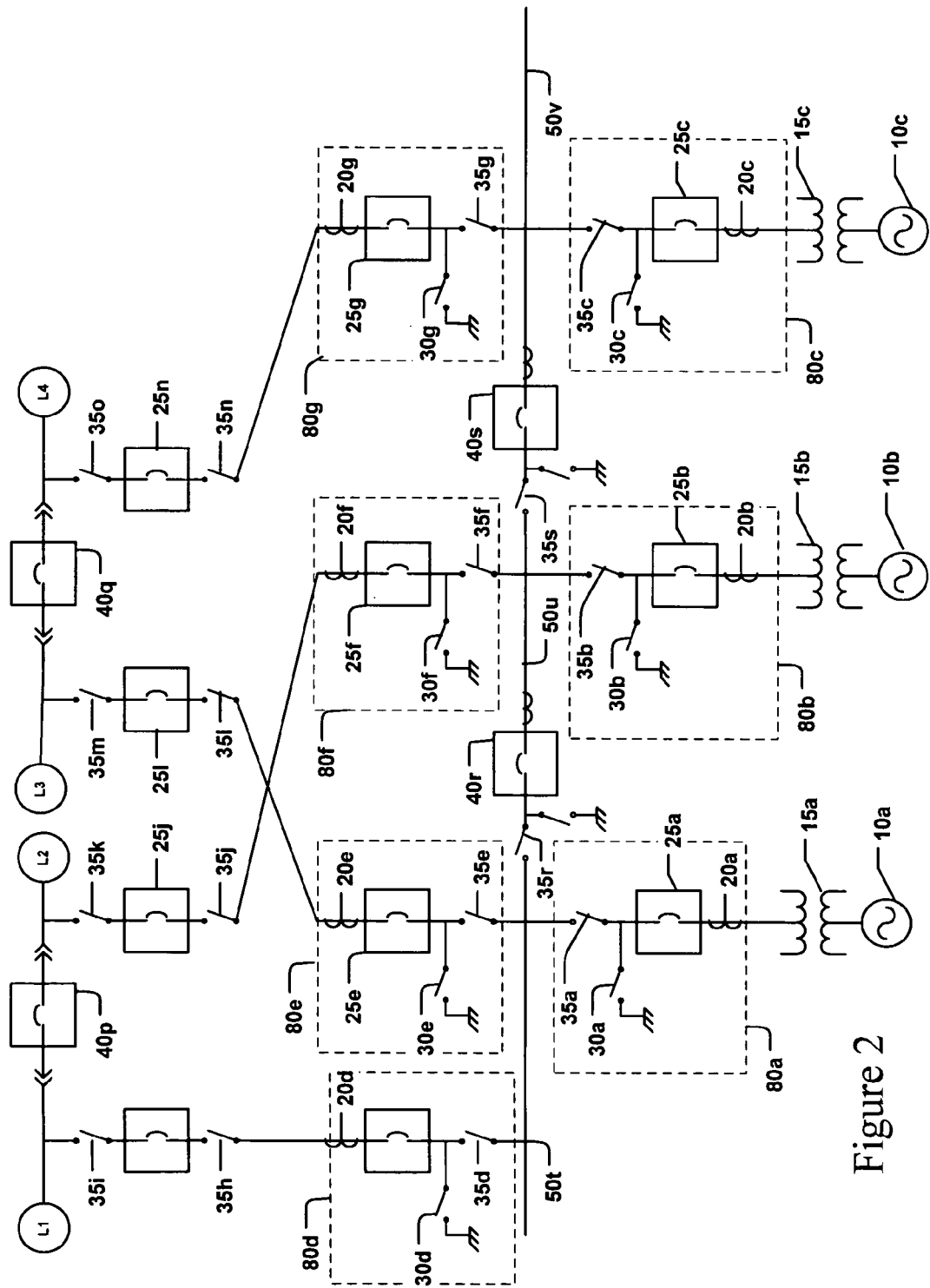
FIG. 2 is a graphical representation of an exemplary power network having integrated components for which a power network reliability assessment may be determined in accordance with an embodiment of the invention.

To illustrate a power network having an integrated component, as shown in FIG. 2, integrated component 80f includes disconnector 35f, grounding switch 30f, circuit breaker 25f, and CT 20f. As shown in FIG. 2, the integrated component, module 80f, includes the functionality of several components. That is, module 80f includes the functionality of a disconnector switch, a grounding switch, a circuit breaker and a CT. Therefore, the integrated component includes subcomponents (i.e., individual components), each of which, may in turn include several subcomponents. FIGS. 1 and 2 are exemplary only and are not intended to limit the invention to any particular configuration of power network components. The invention may be used in any power network reliability assessment using a failure rate.

In conventional reliability assessment, power network reliability is determined assuming that each similar component has a similar failure rate. However, when different components have been subjected to different conditions, this assumption may lead to inaccurate results. If the failure rate is estimated inaccurately, many other reliability assessment parameters may also be inaccurate, such as, for example, the expected outage frequency and duration, and the like. Additionally, fault simulation results, maintenance simulation results, and reconfiguration simulation results may also be inaccurate.

Illustrative Computing Environment and System

Figure 3:
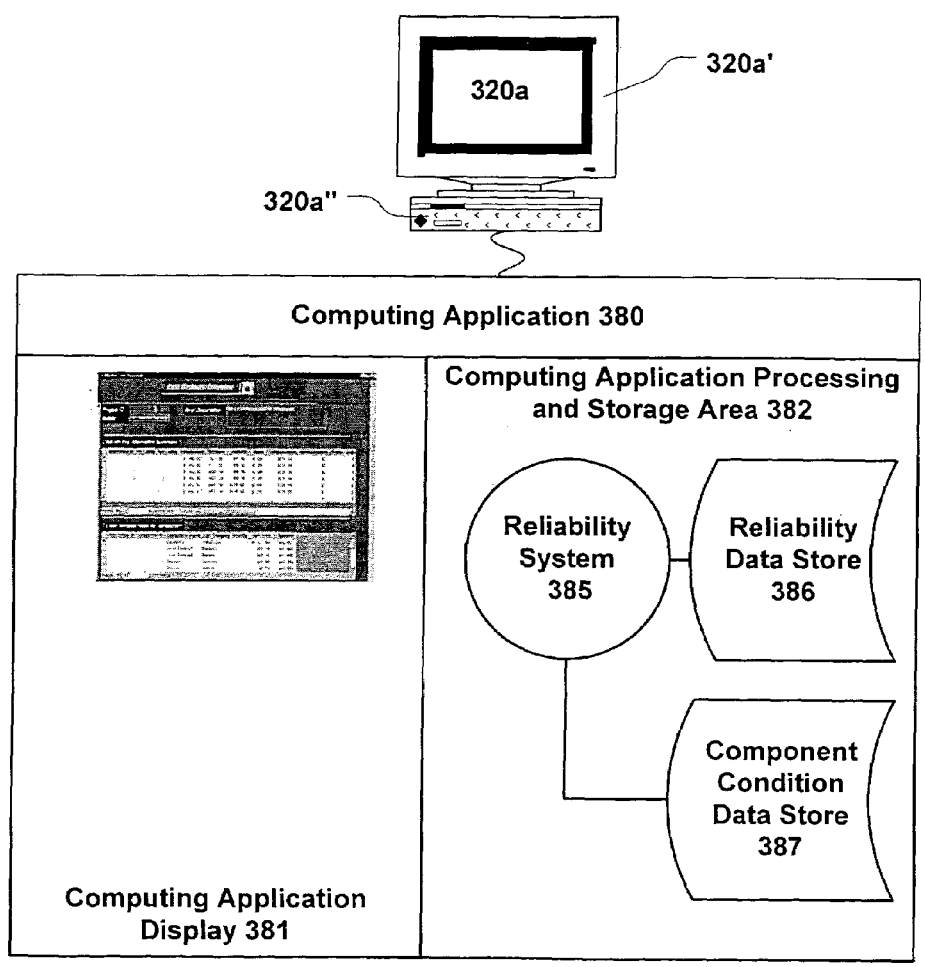
FIG. 3 is a diagram of an illustrative computing environment and an illustrative system for power network reliability assessment in accordance with an embodiment of the invention.

FIG. 3 shows computing system 320 that includes computer 320a. Computer 320a includes display device 320a' and interface and processing unit 320a". Computer 320a executes computing application 380. As shown, computing application 380 includes a computing application processing and storage area 382 and a computing application display 381. Computing application processing and storage area 382 may include reliability system 385, reliability data 386, and component condition data 387. Reliability system 385 may implement systems and methods for power network reliability assessment. Computing application display 381 may include display content which may be used for power network reliability assessment. In operation, a user (not shown) may interface with computing application 380 through computer 320a. The user may navigate through computing application 380 to input, display, and generate data and information for power network reliability assessment.

Computing application 380 may generate an assessment of power network reliability, such as, for example, an adjusted component failure rate, an expected outage frequency (e.g., the expected number of times that a component will be de-energized per year), a self maintenance outage frequency (e.g., the expected number of times that a component will be de-energized due to a maintenance of that component), another maintenance frequency (e.g., the expected number of times that a component will be de-energized due to maintenance of another component), and the like. The power network reliability assessment may be displayed to the user as display content via computing application display 381.

Figure 4:
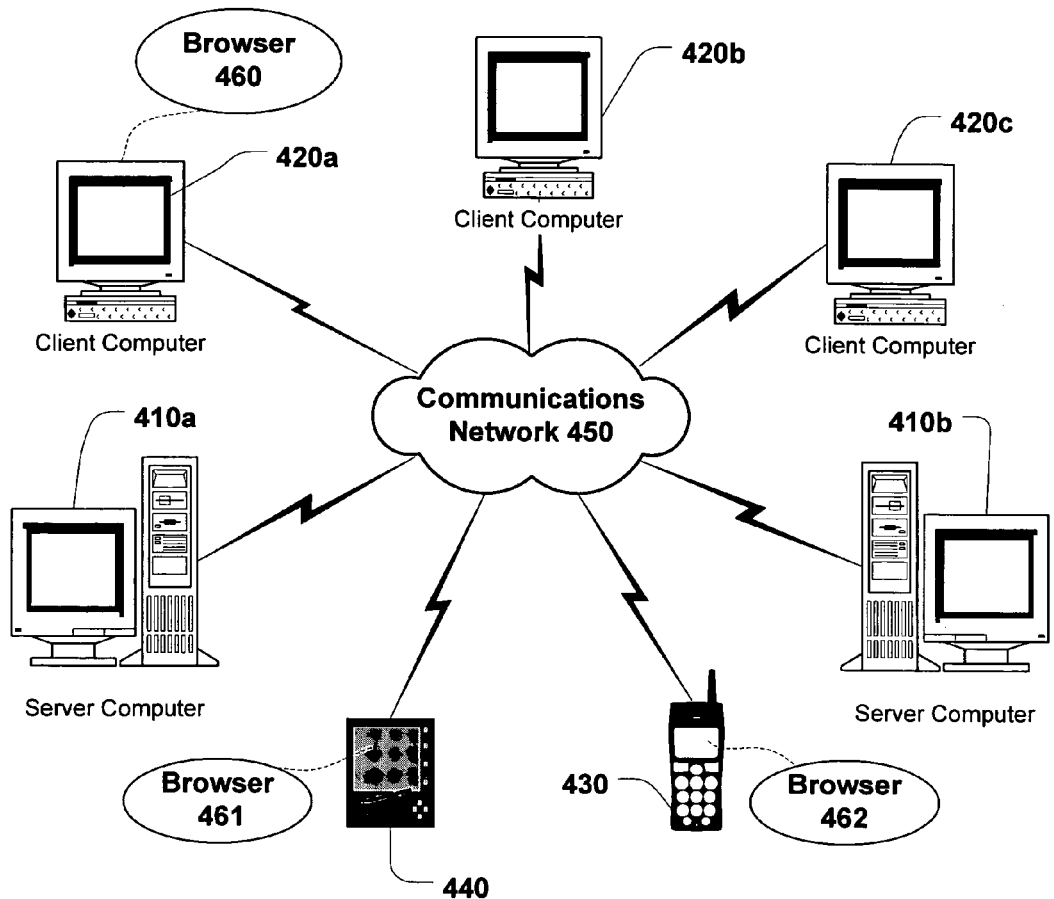
FIG. 4 is a diagram of an illustrative networked computing environment with which the illustrative system for power network reliability assessment may be employed in accordance with an embodiment of the invention.

Computer 320a, described above, can be deployed as part of a computer network. In general, the description for computers may apply to both server computers and client computers deployed in a network environment. FIG. 4 illustrates an exemplary networked computer environment having server computers in communication with client computers, in which systems and methods for power network reliability assessment may be implemented. As shown in FIG. 4, a number of server computers 410a, 410b, etc., are interconnected via a communications network 450 with a number of client computers 420a, 420b, 420c, etc., or other computing devices, such as, a mobile phone 430, and a personal digital assistant 440. Communication network 450 may be a wireless network, a fixed-wire network, a local area network (LAN), a wide area network (WAN), an intranet, an extranet, the Internet, or the like. In a network environment in which the communications network 450 is the Internet, for example, server computers 410 can be Web servers with which client computers 420 communicate via any of a number of known communication protocols, such as, hypertext transfer protocol (HTTP), wireless application protocol (WAP), and the like. Each client computer 420 can be equipped with a browser 460 to communicate with server computers 410. Similarly, personal digital assistant 440 can be equipped with a browser 461 and mobile phone 430 can be equipped with a browser 462 to display and communicate data and information.

In operation, the user may interact with computing application 380 to perform power network reliability assessment, as described above. The generated reliability assessments may be stored on server computers 410, client computers 420, or other client computing devices. The generated reliability assessments may be communicated to users via client computing devices, client computers 420, or the like.

Thus, systems and methods for power network reliability assessment can be implemented and used in a computer network environment having client computing devices for accessing and interacting with the network and a server computer for interacting with client computers. The systems and methods can be implemented with a variety of network-based and standalone architectures, and thus should not be limited to the examples shown.

Data Stores

Computing application processing and storage area 382 may include a reliability data store 386 and a component condition data store 387. Reliability data store 386 may include information representative of the reliability of power network components, such as, for example, historical information on the failure rate of a particular type of circuit breaker, historical information on the failure rate of a particular type of power transformer, historical information on the failure rate of a particular type of overhead power line, and the like. Such information may be available from various electric utility organizations and particular illustrations of such information are described in more detail below. The information may be in the form of a reference database (e.g., a library of component failure rates, aggregated and decomposed, national/regional average and utility-specific statistics, and the like). This component reliability data represents typical average system values for different types of components. The information in reliability data store 386 may be used by reliability system 385 to determine a failure rate for a type of power network component, which may in turn be used to determine a reliability assessment for the power network.

Component condition data store 387 may include information representative of the condition of a particular power network component, such as, for example, the age of a particular circuit breaker, the number of problems experienced with a particular circuit breaker, the number of months since the last preventive maintenance performed on a particular circuit breaker, and the like. Such information is described in more detail below. The information in component condition data store 387 can be used by reliability system 385 to adjust the failure rate determined from reliability data store 386.

The information may include details of line sections of different feeders of a power network. Specifically, the data may include the length, size and type of conductor, numbers of trees in the vicinity, the protective device, the number of customers, connectivity information for the line sections, and the like. The number of years since the last tree trimming may also be specified for some of the line sections. The information may also include a list of interruptions on feeders for a period of years, the time and date of the interruption, the duration of the interruption, the type of protective device that operated during the interruption, the number of customers interrupted, the location or most likely location of the interruption, the cause of the interruption, and the like.

The information may also include weather data for the geographical location of the utility. This information may include daily average wind speed, daily peak wind speed, an indicator of thunderstorm activity for each day, and the like. Three wind related factors may include peak wind speed, number of days with peak speed higher than 16 miles/hour, and number of days with average speed higher than 10 miles/hour for a given year to determine a wind index for each year. In this manner, reliability assessment system 385 may be able to more realistically model the reliability of a power network.

Computing application processing and storage area 382 may include other data stores (not shown). For example, computing application processing and storage area 382 may include a data store that contains information representative of the interconnectivity of individual components of a power network, for example, the interconnectivity of the components of FIG. 1. In this case, the data store may include information representing that generator 10*a* is electrically connected to transformer 15*a*, etc. Computing application processing and storage area 382 may further include a data store that contains information representative of individual component maintenance times, maintenance frequencies, failure times, and the like, such as, for example, a maintenance frequency (MF), a mean time to maintain (MTTM), a mean time to repair (MTTR), a mean time to switch (MTTS) for switching components, and the like, which may be used to determine a reliability assessment for a power network.

While computing application processing and storage area 382 includes two databases, computing application processing and storage area 382 may include any number of databases. Further, the various data and information within computing application processing and storage area 382 may be distributed among various databases in any convenient fashion. Moreover, the data and information in computing application processing and storage area 382 may be stored in any convenient manner, such as, for example, in a multidimensional database, a relational database, tables, data structures, an analytical database, an operational database, a hybrid database, a text file, and the like.

Reliability System

One of the challenges of performing reliability assessment is to have an accurate set of component failure rates. In the past, analysis was performed with typical average values gleaned from the literature. Unfortunately there are a number of problems associated with utilizing industry averages for reliability analysis. For example, components of the failure rate are generally not available (e.g., which portion of the failure rate is due to lightning, animal, trees, accident, subcomponents of the power component, etc.). Also, failure rates are not currently available on a seasonal basis for determining the impact of lightning activity, storms, and the like. Further, failure rates are not available that take into consideration the impact of preventive maintenance, such as, for example, tree trimming, insulator cleaning, and the like.

Reliability system 385 may modify the conventional component failure rate (e.g., determined by analyzing a population of components of a similar type) according to factors that impact the actual failure rate, such as the condition of the component. The factors may include intrinsic factors, external factors, human errors, operation and maintenance factors, and the like. Intrinsic factors may include factors such as age of equipment, manufacturing defects, size of conductors, and the like. External factors may include factors such as exposure to trees, birds/animals, wind, lightning, ice, and the like. Human error factors may include factors, such as vehicular accidents, accidents caused by utility or contractor work crew, vandalism, and the like. Historical information can also be utilized to help tune the model, as described in more detail below.

Reliability system 385 may determine adjusted failure rates for various power network components, such as, for example, transformers, cables, circuit breakers, overhead lines, and the like. A failure rate may be the frequency that a sustained fault will occur on a piece of equipment that needs to be fixed by crews, and is usually measured as the interruptions per mile-year for overhead lines and cables or the interruptions per year for transformers and circuit breakers, but may be described in other terms. Components may be assigned an adjusted failure rate close to or very different from the conventional failure rates depending on the component conditions. Under extreme conditions, components on the system may be expected to experience many more outages than the average failure rate. For example, it is expected that exposure to harsh environmental conditions or extended deterioration of a component can increase the frequency of service interruptions. Under ideal conditions, components on the system may be expected to experience less outages than the average failure rate. For example, it is expected that effective preventive maintenance can reduce the frequency of service interruptions.

Reliability system 385 may modify or adjust the average failure rate based on a variety of factors. For example, the component failure rate can be decomposed into failure rates associated with a number of predefined contribution factors (e.g., primary causes of interruptions or subcomponents). Also, each contribution factor may be correlated to a number of sub-factors (e.g., features representing component conditions). These factors (or features) can be measured or observed based on predefined assessment criteria and may include preventive maintenance activities.

Figure 5:
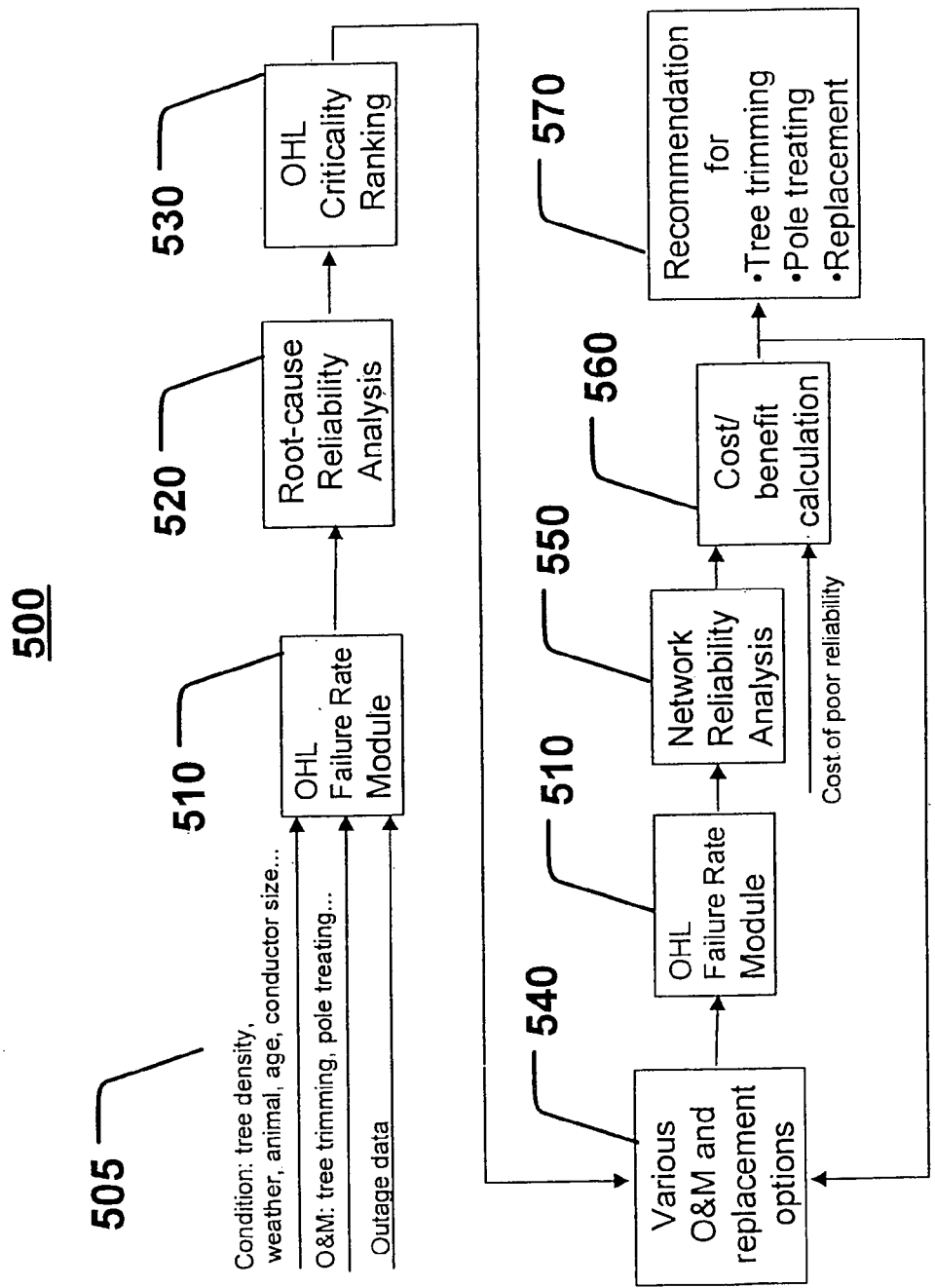
FIG. 5 is a diagram of an illustrative system for power network reliability assessment including an illustrative subsystem for failure rate adjustment in accordance with an embodiment of the invention.

Reliability system 385 may determine an adjusted failure rate to determine a reliability assessment of the power network. Reliability system 385 may include a reliability assessment system that uses the adjusted failure rate and also determines other reliability assessments of the power network. For example, reliability system 385 may be implemented in a reliability assessment system 500 shown in FIG. 5. Illustrative reliability assessment system 500 assesses the reliability of overhead lines (OHL), however, system 500 may assess the reliability of any power network component, may assess the reliability of the entire power network, a portion of the power network, and the like. As shown in FIG. 5, system 500 receives information 505 that includes information representative of the condition of a power network component (e.g., the condition of an overhead line, the tree density near the overhead line, etc.). Module 510 determines an adjusted failure rate of a power network component based on information 505. Root cause analysis module 520 may identify factors with the largest impact on power network reliability based on the adjusted failure rate. Criticality ranking module 530 may rank factors based on their impact on failure rates and may rank power network components based on their impact on the power network reliability. Options module 540 may receive various options (e.g., from a user interface or a part of an analysis program) related to operation, maintenance, and component replacement. Module 510 may determine various adjusted failure rates based on the various options received by module 540. The adjusted failure rates may be used by reliability assessment module 550 (which may be a conventional reliability assessment module) to determine reliability assessments based on the various adjusted failure rates. The various reliability assessments may be received by cost/benefit calculation module 560 which may analyze the costs and benefits associated with the various operation, maintenance, and replacement options received by options module 540. Cost/benefit calculation module 560 may then determine a recommended operation, maintenance, or replacement strategy 570, such as, for example, a recommendation to trim trees near the overhead power line, and the like. As can be seen, the adjusted failure rate can be incorporated into a conventional reliability assessment system (e.g., via incorporation of failure rate module 510 into an existing reliability assessment system), thereby leveraging the existing investment in existing reliability assessment systems.

Figure 6:
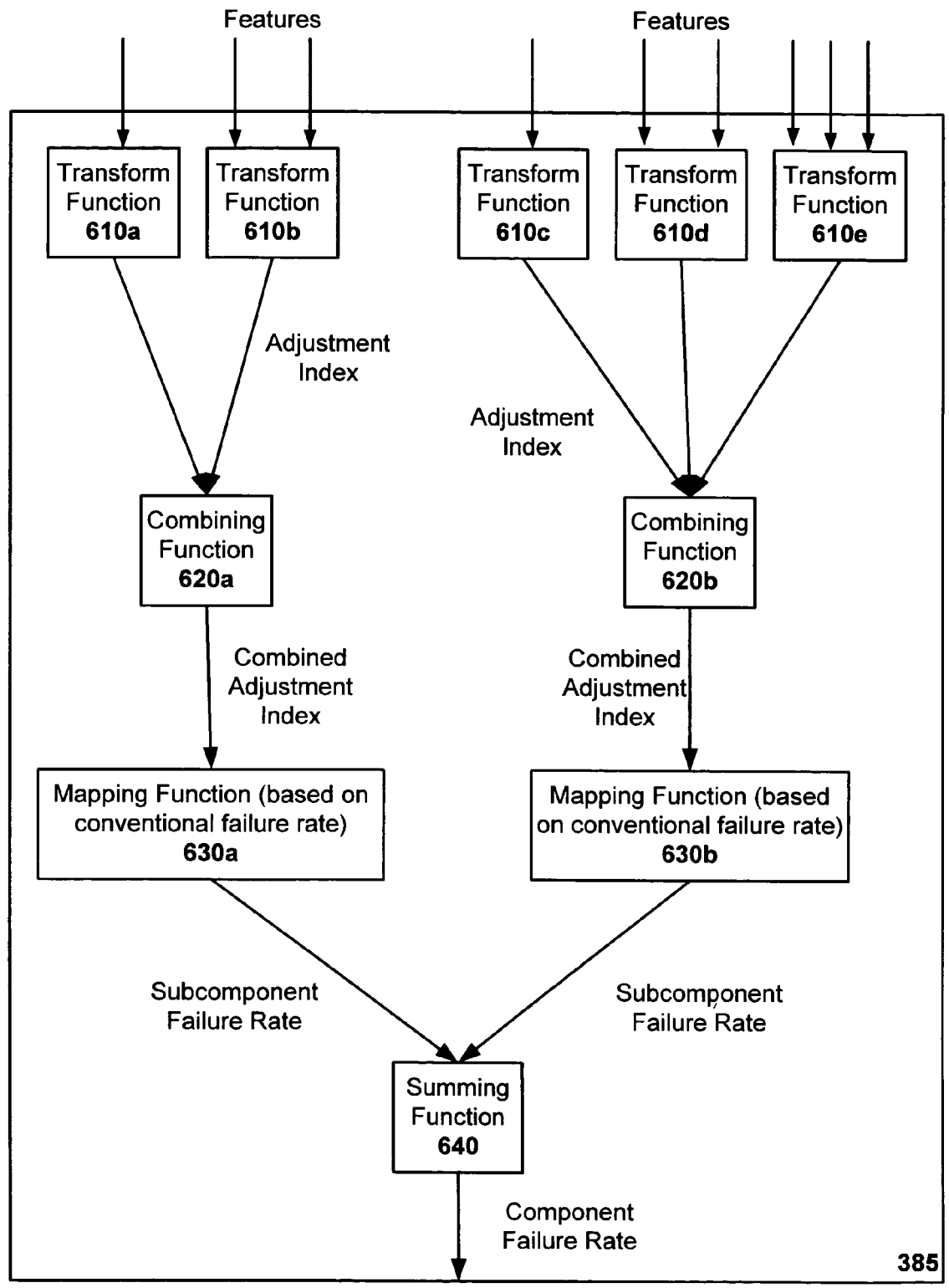
FIG. 6 is a diagram of an illustrative system for power network reliability assessment including an indication of illustrative data flow within the system in accordance with an embodiment of the invention.
Figure 7:
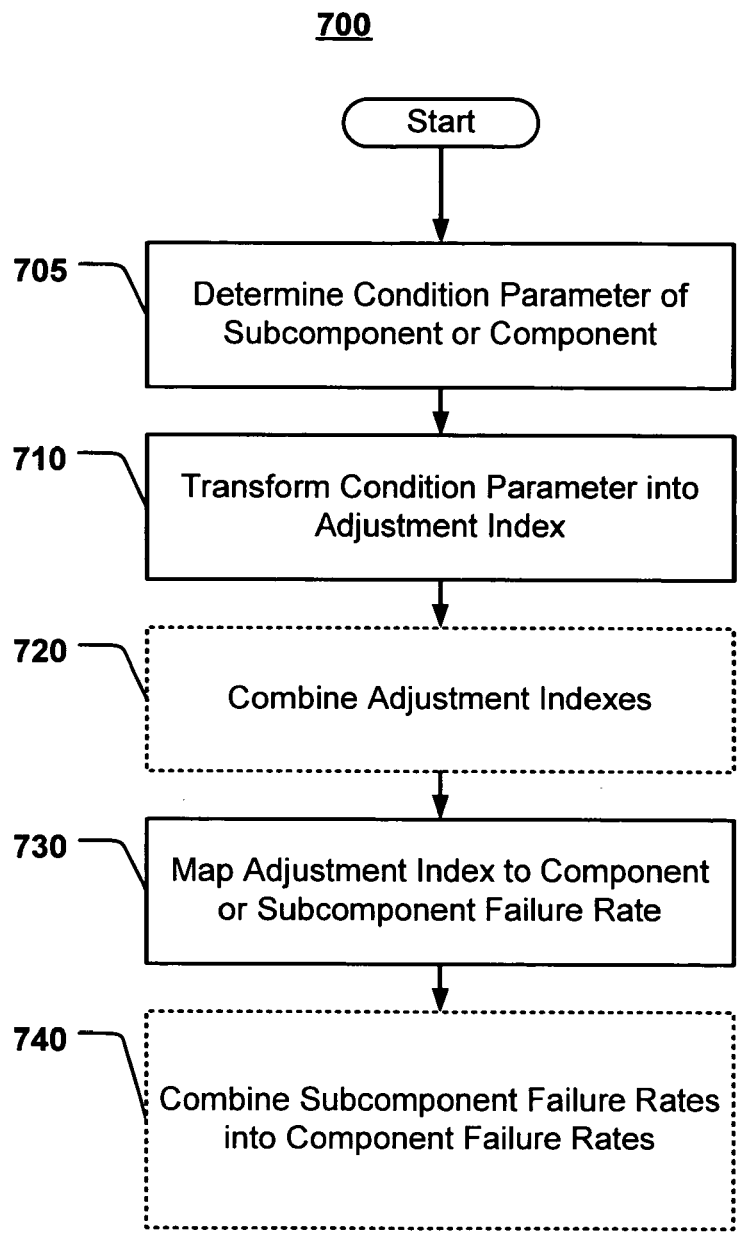
FIG. 7 is a flow chart of an illustrative method for power network reliability assessment in accordance with an embodiment of the invention.

Determining an adjusted failure rate may be implemented by reliability system 385 in a variety of ways. FIG. 6 shows illustrative details of reliability system 385 and FIG. 7 shows an illustrative method 700 for determining the adjusted failure rate. While the following description may include references to the computing system of FIG. 3, method 700 and system 385 may be implemented in a variety of ways, such as, for example, by a single computing engine, by multiple computing engines, via a standalone computing system, via a networked computing system, via other knowledge-based systems, and the like.

As shown, at step 705 reliability system 385 determines condition features of the power network component. The condition features may include the age of the power network component, the maintenance performed on the power network component, and the like and may be received from component condition data store 387.

At step 710, transform function 610 of reliability system 385 may transform the condition feature into an adjustment index, as described in more detail below. As shown in FIG. 6, transform functions 610a–610e may each receive a single or multiple features.

At optional step 720, combining function 620 of reliability system 385 may combine multiple adjustment indexes into a combined adjustment index. As shown in FIG. 6, combining function 620a combines the adjustment indexes from transform functions 610a and 610b and combining function 620b combines the adjustment indexes from transform functions 610c, 610d, and 610e.

At step 730, mapping function 630 of reliability system 385 maps the adjustment index from step 710 (or the combined adjustment index from step 720 if there is more than one adjustment index) into a subcomponent failure rate (or into a component failure rate if there is one adjustment index). As shown in FIG. 6, mapping function 630 maps an adjustment index into a subcomponent failure rate. As shown, mapping function 630a maps the combined adjustment index from combining function 620a into a subcomponent failure rate and mapping function 630b maps the combined adjustment index from combining function 620b into a subcomponent failure rate.

Figure 8:
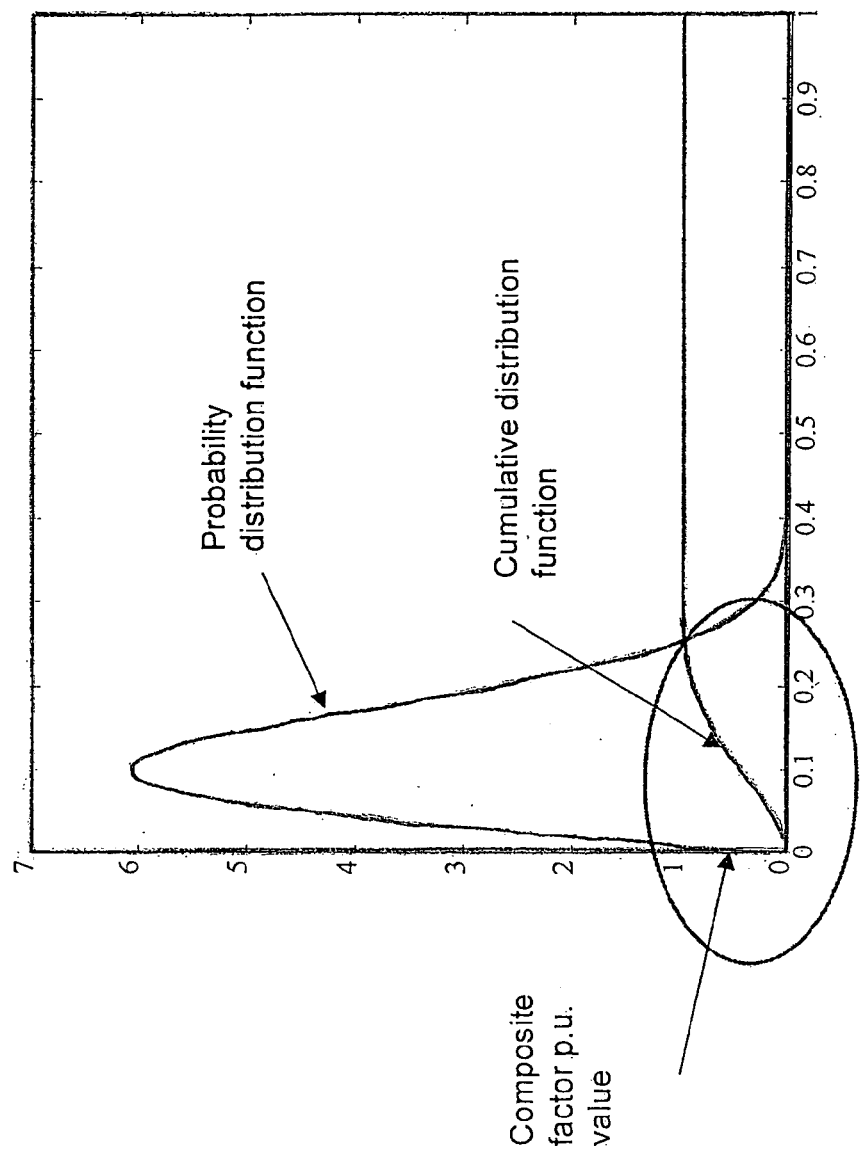
FIG. 8 is a chart illustrating the concept of mapping a combined adjustment index into a subcomponent failure rate in accordance with an embodiment of the invention.

An appropriate cumulative distribution function (CDF) can be defined for each type of component to represent the statistical characteristics of component failure rates or factor-related failure rates. The statistical characteristics of component failure rates can be represented by appropriate distribution functions, such as, for example, in the form of a WeiBull distribution or a Lognormal distribution. Furthermore, the parameters of such distribution functions can be properly determined based on the given average failure rate and some boundary conditions. FIG. 8 shows an illustrative probability distribution function and a cumulative distribution function for determining a failure rate. As shown in the chart of FIG. 8, the x-axis denotes a failure rate, the y-axis denotes a probability of failure. The probability distribution function curve is the probability distribution function of the failure rate of a specific type of network component. The cumulative probability distribution curve is the cumulative probability distribution function of the failure rate of a specific type of network component type.

At optional step 740, summing function 640 of reliability system 385 combines the subcomponent failure rates from step 730 into a component failure rate. As shown in FIG. 6, summing function 640 sums the subcomponent failure rates from mapping functions 630a and 630b into a component failure rate.

As can be appreciated from the description above, the fact that reliability performance of components on a power network is related to their healthy, operational and environmental conditions can now be considered in a reliability analysis. In more detail, an adjusted component failure rate ($\lambda_C$) may be calculated as the sum of all factor or feature-related failure rates ($\lambda_F$). Weight multipliers may be applied to the component and the factor-related failure rates such that the failure rate model can generate a component reliability failure rate consistent with particular component system outage statistics, such as for example, given in Equation 1.

$$\lambda_C = W_C \sum_i W_{F,i} \lambda_{F,i}$$

Equation 1

Each factor-related failure rate ($\lambda_F$) may be a single-input, single output (SISO) function of a composite per-unit factor value (CF) which represents the overall component exposure to forced outage relating to that particular cause or subcomponent. An appropriate cumulative distribution function, typically in the form of WeiBull distribution or Lognormal distribution, may be defined to transform CF to $\lambda_F$.

$$\lambda_{F,i} = f(CF_i) \; i=1, \ldots N$$

Equation 2

The composite per-unit factor value (CF) may be calculated as a product or a weighted sum of all normalized sub-factor values (NSF). Multiplier $W_{SF}$ is applied such that the failure rate model can be tuned to output an average-valued CF, for example 0.5, corresponding to a default or typical set of component conditions.

Product:

$$CF_i = W_{SF} \prod_j NSF_j \; i=1, \ldots, N$$

Equation 3

Weighted Sum:

$$CF_i = W_{SF} \frac{\sum_j W_{SF,j} NSF_j}{\sum_j W_{SF,j} NSF_{j-\max}} \; i=1, \ldots, N$$

Equation 4

Each normalized sub-factor value (NSF) may be a SISO function of the original sub-factor value (SF) or input variable. The SISO function may be selected from a range of forms, including linear, power, exponential, logistic functions, and the like.

$$NSF_j = f(SF_j)$$

Equation 5

For each type of component, the failure rate model may receive a set of input variables or features representing the component condition that may have impacts on actual component reliability. The input variables may include design and operational characteristics, external conditions, environmental exposures, preventive maintenance activities, and the like. Default values may be predefined values representing component conditions associated with the average system failure rates. Value ranges may be predefined and assessment criteria may be objectively (e.g., operation history and testing) or subjectively (e.g., inspection and estimation) determined. An input variable may have an impact on multiple factor-related failure rates. Also, an input variable may be disabled if the information is not available.

Normalization may be provided as a basis of performing intermediate multi-attribute calculations and to reflect any saturation effects. Various SISO functions can be implemented as normalization functions, all of the illustrative functions having two parameters (e.g., A and B). For example, the following functions may be implemented: Linear, $f(x)=Ax+B$; Power, $f(x)=A(x^B)$; Exponential 1, $f(x)=A[\exp(-Bx)]$; Exponential 2, $f(x)=A[1-\exp(-Bx)]$; Logistic, $f(x)=A/[1+\exp(-Bx)]$, and the like. Various default normalization functions may be implemented for different types of input variables.

Feature mapping attempts to develop a set of functions that can be used to determine how each feature will impact the adjusted failure rates. Component outage statistics and consultations with experienced engineers in equipment design and operation may be used to develop these mapping functions. Illustrative mapping functions for substation transformers, cables, circuit breakers and overhead lines, are described in more detail below. The mapping functions may be defined based on Equations 3 and 4 and may provide quantitative relationships between factors and related features. With these mapping functions, the composite per-unit factor values can be calculated as a result of all features at the assessed component conditions.

The composite per-unit factor values may then be transformed to the factor-related failure rates based on appropriate probability distributions. FIG. 8 shows the concept of such a transformation. It may be assumed that the failure rates of a specific type of component observes a particular probability distribution, for example, in the form of WeiBull distribution or Lognormal distribution. This means that the composite per-unit factor value may be regarded as the probability of a piece of equipment having an outage frequency equal to or higher than a corresponding failure rate. In other words, an appropriately defined cumulative distribution function (CDF) may be used to transform a composite per-unit factor value to a factor-related failure rate. The CDF should typically have an average system failure rate assigned to the component when all features are valued at typical or average conditions, a value <=lower bound failure rate may be assumed when all features are valued to represent a set of best conditions, and a value >=upper bound failure rate may be assumed when all features are valued to represent a set of worst conditions.

When using Lognormal distribution for failure rate transformation, the composite per-unit factor value may first be transformed to a multiplier to the system average value of factor-related failure rate. The product of this multiplier and the system average value of factor-related failure rate may then give the expected factor-related failure rate for this particular component. The Lognomal CDF may be defined with two parameters $\mu$ and $\sigma$, where $\mu$ is equal to zero and $\sigma$ should be valued such that the predefined boundary conditions can be satisfied. Specific illustrations of determining an adjusted failure rate are given below.

Transformers

Transformers can be categorized in different ways, for example, oil-filled or dry-type, three-phase or single-phase, by voltage level, and the like. Such categorizing may help reduce the complexity involved with trying to setup a universal model for all transformers. The illustration below considers a substation level oil-filled power transformer.

Table 1 lists measurable and/or observable transformer features and categorizes them into eight component-related factors that may contribute to the overall failure rate.

TABLE 1

| Factor | Sub-factor | Feature | Mini | Medium | Complete |
|---|---|---|---|---|---|
| Solid Insulation (Winding + Leads) | Age | Operating time in years | X | X | X |
| | Mechanical strength | Degree of polymerization (DP) | | | X |
| | Partial discharge (PD) | PD intensity: discharge amplitude (pC) * discharge rate (pulses per second) | | | X |
| | Loss | Power factor (PF) | X | X | X |
| | Moisture | Water content (% weight), may be estimated from gas-in-oil analysis | | X | X |
| | External events | Number of experienced through faults | | | X |
| Liquid Insulation (Other) | Service time | Time from last service (replace, degassing) | | X | X |
| | Condition | A composite value based on gas-in-oil analysis. May be very complex | | | X |
| | Oil treatment | Gas-in-oil monitoring, oil replace or degassing | | X | X |
| | Developing trend of condition | A composite value based on history of gas-in-oil analysis. May be very complex | | | X |
| | Loss | Power factor (PF) | X | X | X |
| | Electrical strength | Breakdown level in kV/mm | X | X | X |
| Thermal Stress (Cooling equipment) | Condition of cooling system | A composite value from the status of fans, pumps | | X | X |
| | Environment | Average ambient temperature | | X | X |
| | Load level | Average load factor | X | X | X |
| | Coil temperature | Average top oil temperature and winding spot temperature from internal sensors | | | X |
| Core | Structure tightness | Noise level | X | X | X |
| | Maintenance | Tear down inspection | | | X |
| Bushing | Type | Gas filled, oil filled or paper | | | X |
| | Loss | Power factor | X | X | X |
| | Partial discharge (PD) | PD intensity: discharge amplitude (pC) * discharge rate (pulses per second) | | | X |
| | Voltage distribution | Evenness of the voltage distribution | | | X |
| | Structure Integrity | Damage/leakage inspection/repair | | X | X |
| On-Load Tap Changer | External events | Number of experienced through faults | | | X |
| | Load level | Average load factor | X | X | X |
| | Working duty | Real operation times per month over designed operation times per month | X | X | X |
| | Condition | A composite value based on gas-in-oil analysis. May be very complex | | | X |
| Control & Protection | Readiness | Installation and settings | | X | X |
| | Service time | Time from last maintenance | | | X |
| | Network characteristics | Frequency of operating events | X | X | X |
| | Weather characteristics | Lightning activities | X | X | X |
| Auxiliary equipment | Condition | Condition of CT, PT and the like | | | X |
| | Maintenance | Maintenance of CT, PT and the like | X | X | X |

In Table 1, the columns "Mini," "Medium," and "Complete" are used to group the features. Features in one group correspond to one implementation of the transformer failure rate model. While the "Mini" model shown in FIG. 10 was actually implemented, various transformer failure rate models may be developed.

The "Mini" model used the inverse Weibull CDF function and a weighted sum of the factors specified. The inverse CDF function was calibrated under the assumption that the mean failure rate corresponds to CDF=0.5 and three times the mean failure rate corresponds to CDF=0.95. The weights were defaulted to 1 because the decomposition of utility level failure rate into factor related failure rates already considered the utility failure rate statistics. However, a user may choose to change weights and the factor-related failure rates' distribution parameters to better reflect actual utility situations.

Figure 10:
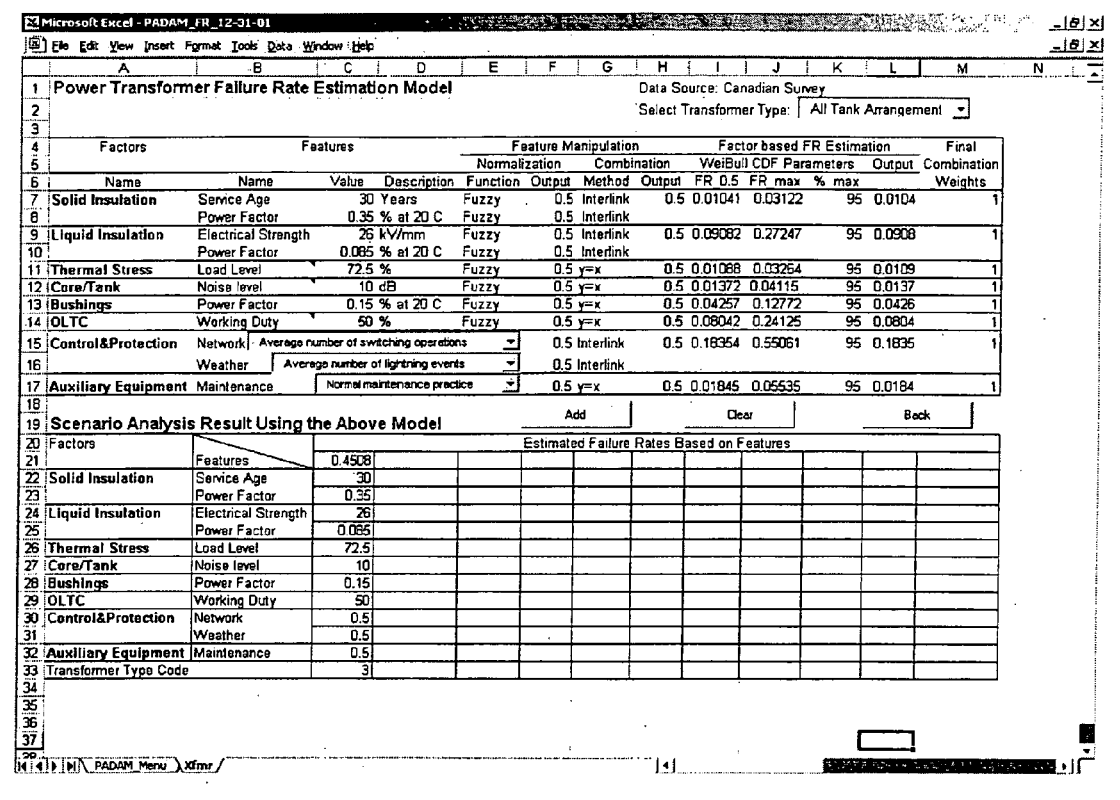

The "Mini" model was implemented using an Excel spreadsheet. As shown in FIG. 10, the model may include three parts: the upper-right "Transformer Type Selection" part, the middle "Modeling" part and the lower "Result Presentation" part. Changing the transformer type will change the values of column "FR_0.5" and "FR_max" in the modeling part, but the user can override values in these two columns once the type is fixed. The modeling part includes five groups of columns: "Factors," "Features," "Feature Manipulation," "Factor based FR Estimation," and "Final Combination Weights." The "Factor" column shows the name of the factor. The "Features" group includes three columns: the "Name" for identification, the "Value" for input, and the "Description" for unit explanation. Comments in the "Name" cells instruct users how to compute the input value. The "Feature Manipulation" group includes the "Normalization" of features where the feature-subfactor SISO functions are applied, and the "Combination" of subfactor values where the weighted sum or product operations take place and the subfactor-factor SISO functions are applied. Then, the "Factor based FR Estimation" group may use the failure rate statistics to compute the failure rate related to each factor, and the final failure rate may be computed using the "Final Combination Weights" and the "Output" of "Factor based FR Estimation." In the "Result Presentation" part, each final failure rate can be listed with its corresponding feature values and the transformer type, allowing a quick comparison between up to 11 scenarios or more. This is done by using the "Add" button once the feature values and the transformer type is fixed. The user can clear the presentation part using the "Clear" button. The user may be advised not to change anything other than work with the "Value" column in "Features" group, the three columns of "WeiBull CDF Parameters," the "Final Combination Weights" column, and the combo boxes.

Three transformer types and their decomposed factor related failure rates were identified and are listed in Table 2.

The decomposition is based on the statistical percentage each factor contributes to the overall failure rate.

TABLE 2

| | Xfmr Type | | |
|---|---|---|---|
| Factors | One Three-Phase | Three Single-Phase | All Tank Arrangement |
| Solid Insulation | 0.00201542 | 0.00116043 | 0.01040682 |
| Liquid Insulation | 0.01703028 | 0.01334494 | 0.09082308 |
| Thermal Stress | 0.00211619 | 0.00116043 | 0.01087985 |
| Core/Tank | 0.00262004 | 0.00174064 | 0.01371807 |
| Bushings | 0.00836398 | 0.0040615 | 0.04257332 |
| OLTC | 0.01612334 | 0.00580215 | 0.08041627 |
| Control&Protection | 0.03657984 | 0.01450537 | 0.18353832 |
| Auxiliary Equipment | 0.00342621 | 0.00290107 | 0.01844844 |

The following SISO functions correspond to the "Mini" transformer failure rate model and were developed based on several IEEE standards and experience. A solid insulation (SI) function may be implemented with Equation 6:

$$f(SI) = 1 - \exp(-2.7726 \cdot f(Age) \cdot f(SPF)) \quad \text{Equation 6}$$

where Age is the age of the solid insulation in years and SPF is the solid insulation power factor.

A liquid insulation (LI) function may be implemented with Equation 7:

$$f(LI) = 1 - \exp(-2.7726 \cdot f(OES) \cdot f(OPF)) \quad \text{Equation 7}$$

where OES is the oil electrical strength in kV/mm of the liquid insulation and OPF is the oil power factor.

Figure 11A:
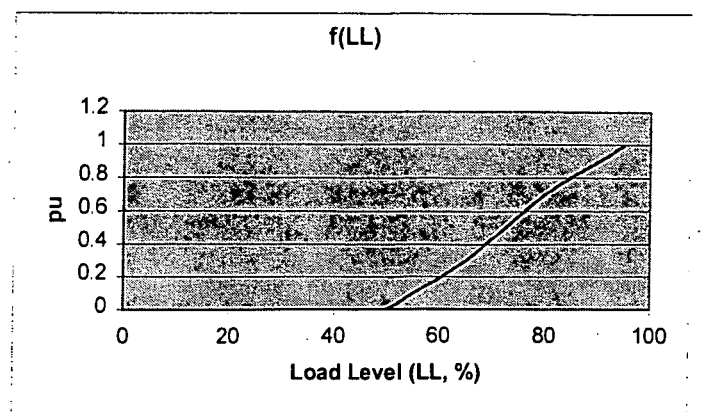
FIGS. 11a–c are diagrams of illustrative functions for failure rate adjustment of subcomponents of a power transformer in accordance with an embodiment of the invention.
Figure 11B:
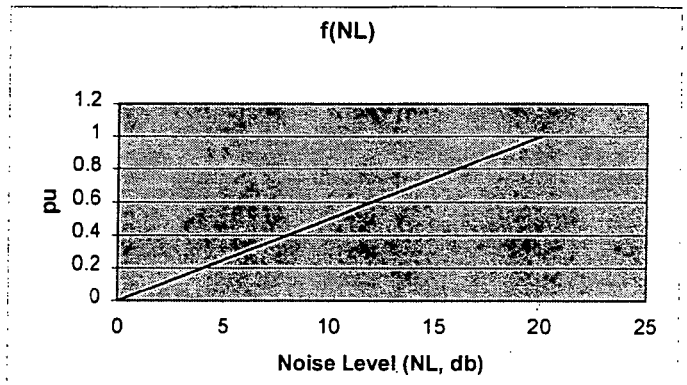
Figure 11C:
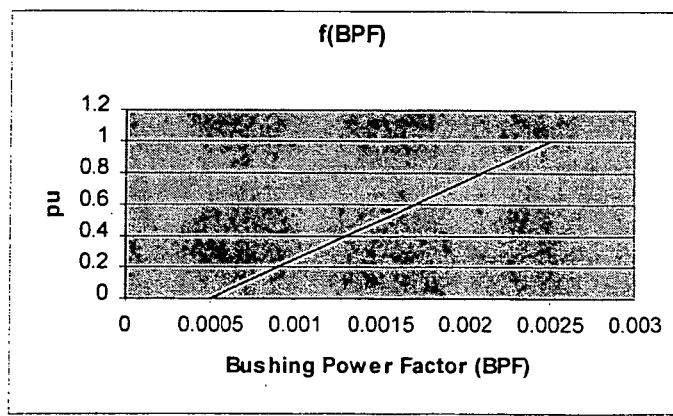

FIGS. 11a, 11b, and 11c show illustrative functions for thermal stress load level feature, core/tank noise level feature, and bushing power factor feature, respectively.

Equations 8 and 9 are illustrative functions for an On-Load Tap Changer (OLTC) Load Level (LL) and Working Duty (Duty), respectively.

$$f(OLTC\text{-}LL) = (OLTC \text{ Average Load Level in \%})/100 \quad \text{Equation 8}$$

$$f(OLTC\text{-}Duty) = (\text{Number of operations per month}) \cdot (\text{Designed life time in months})/(\text{designed operation times}) \quad \text{Equation 9}$$

The combination of the two sub-factors may use Equation 10:

$$f(OLTC) = 1 - \exp(-1.912 \cdot f(OLTC\text{-}LL) \cdot f(OLTC\text{-}Duty)) \quad \text{Equation 10}$$

Equation 11 is illustrative of a control and protection (CP) function that includes network and weather features.

TABLE 3

| Network characteristics | f(Network) |
|---|---|
| Just a few switching operations | 0 |
| Below average number of switching operations | 0.25 |
| Average number of switching operations | 0.5 |
| Above average number of switching operations | 0.75 |
| Excessive number of switching operations | 1 |

| Weather characteristics (lightning activities) | f(weather) |
|---|---|
| A few lightnings | 0 |
| Below average number of lightnings | 0.25 |
| Average number of lightnings | 0.5 |
| Above average number of lightnings | 0.75 |
| Excessive number of lightnings | 1 |

The combination of the two sub-factors may use the following equation:

$$f(CP) = 1 - \exp(-2.7726 \cdot f(Network) \cdot f(Weather)) \quad \text{Equation 11}$$

Table 4 is an illustrative look-up table implementing a function for an auxiliary equipment maintenance function.

TABLE 4

| Auxiliary equipment maintenance | f(Aux) |
|---|---|
| No maintenance at all | 1 |
| Some kinds of maintenance | 0.75 |
| Normal maintenance practice | 0.5 |
| Frequent maintenance | 0.25 |
| Excessive maintenance | 0 |

Cables

Failure rate estimation of underground cables (UG) may be a difficult task because there are so many cable insulation types, joint/termination types, voltage classes, manufacturers, and constructions. Most of the published failure rate data are either individual cable categories, or generally mixed up. Nevertheless, a summary of the literature and experience with cable diagnosis may yield Table 5, which lists the major measurable or observable features and their corresponding factors that contribute to the overall failure rate.

TABLE 5

| Factor | SubFactor | Feature | Mini | Medium | Complete |
|---|---|---|---|---|---|
| Joints and Terminations (Including conductors) | Type | Taped workmanship, Premolded technology, Shrink technology | X | X | X |
| | Service Time | Years | | X | X |
| | Environment | Direct bury, manhole, or cabinent | | X | X |
| | Installation Practice | Crew skillness and responsibility | | | X |
| | Maintenance Practice | Diagnosis/replacement/retrofit program | X | X | X |
| Insulation | Type | HMWPE, XLPE, EPR, TR-XLPE, PILC | X | X | X |
| | Service Time | Years | X | X | X |
| | Installation Mode | Direct bury (DB) or duct installation | X | X | X |
| | Maintenance Practice | Diagnosis/replacement/retrofit program | | | X |
| | Load Level | Loading factor | | X | X |

In Table 5, there are three columns "Mini," "Medium," and "Complete" to group the features. Features in one group correspond to one form of realization of the UG failure rate model. While the "Mini" model was actually implemented, various UG failure rate models may be developed.

The "Mini" model used the inverse Weibull CDF function and a weighted sum of all factors specified by $\lambda_{Fi}$. The inverse CDF function was calibrated under the assumption that the mean failure rate corresponds to CDF=0.5 and three times the mean failure rate corresponds to CDF=0.95. The weights were defaulted to 1 because the decomposition of utility level failure rate into factor related failure rates already considered the utility failure rate statistics. However, the user may choose to change the weights or even the factor related failure rates' distribution parameters to better reflect the actual component situation.

Figure 12:
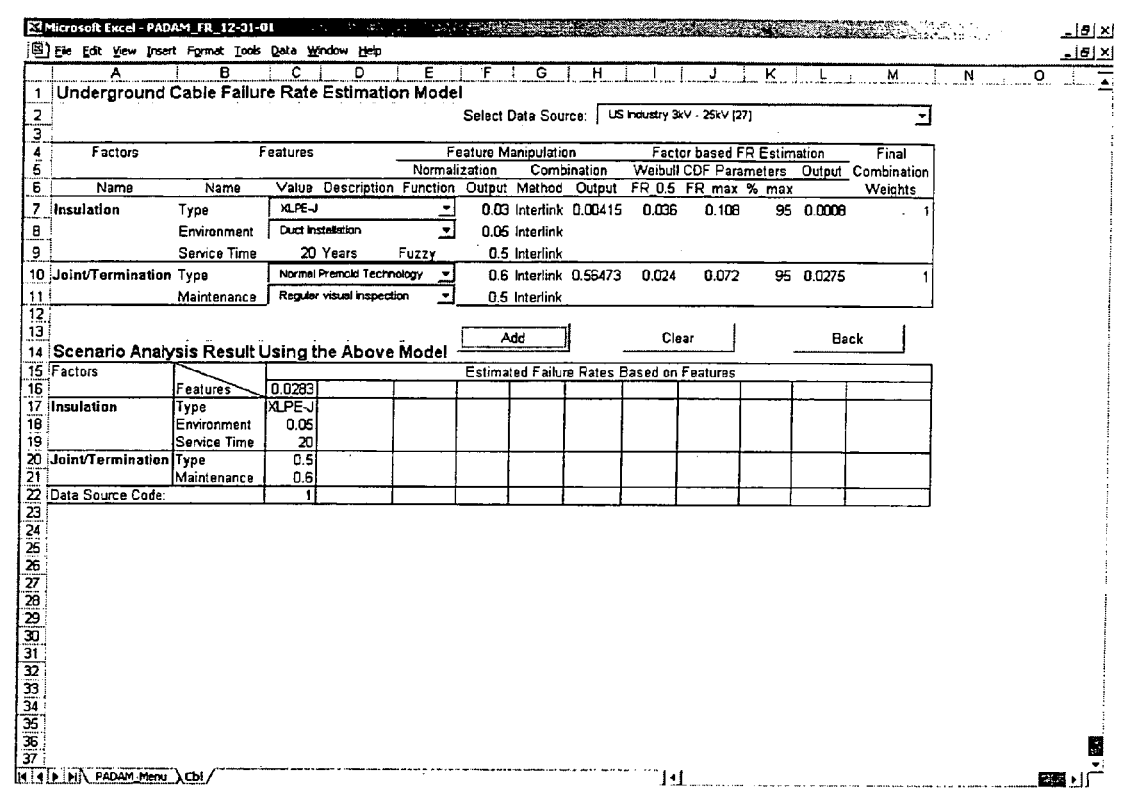

FIG. 12 shows an illustrative cable failure rate model, which is similar to the transformer failure rate model described above. Three data sources were used and the results are summarized in Table 6. Their description, references and mean failure rate (FR_Mean, per mile year) are listed below. To use the FR_Mean data, they may be individually decomposed into cable insulation related mean failure rate FR_Insulation and joint/termination related failure rate FR_JT. The decomposition rules are FR_Insulation=60%*FR_Mean and FR_JT=40%*FR_Mean based on the assumption that 40% of the cable faults may be related to joint/termination/accessories.

TABLE 6

| Data Source | Code | FR_Mean |
|---|---|---|
| US Industry 3 kV–25 kV [27] | 1 | 0.06 |
| Canada Transmission 69 kV–138 kV [23] | 2 | 0.03 |
| Dutch/US West Coast Distribution 10 kV–20 kV [28] | 3 | 0.005 |

The following illustrative SISO functions correspond to the "Mini" UG failure rate model developed based on experience and a summary of the literature. Table 7 is an illustration of a look-up table implemented function for a cable insulation type function.

TABLE 7

| Insulation Type | f(CblType) |
|---|---|
| HMWPE-NJ | 1 |
| XLPE-NJ | 0.5 |
| XLPE-J | 0.03 |
| EPR | 0.05 |
| TR-XLPE | 0.03 |
| PILC | 0 |

In Table 7, HMWPE denotes High Molecular Weight Polyethylene, XLPE denotes Cross-Linked Polyethylene, EPR denotes Ethylene Propylene Rubber, PILC denotes Paper-Insulated Lead Covered, TR means Tree-Retarded, J means jacketed and NJ means non-jacketed. The values of f(Insulation) were determined mainly from AEIC data.

Table 8 is an illustrative look-up table implemented function for a cable installation mode function.

TABLE 8

| Installation Mode | f(CblMode) |
|---|---|
| Direct bury | 1 |
| Duct installation | 0.05 |

The values of f(CblMode) were also determined mainly from AEIC data.

A service time function may be implemented with Equation 12, which was developed using the assumption that the FR_Mean of cables was surveyed at 20 years of age and a cable design life is 35 years:

$$f(Insulation)=1-\exp(-5.545*f(CblType)*f(CblMode)*f(CblAge)) \quad \text{Equation 12}$$

where CblType is the type of cable, CblMode is the installation mode, and CblAge is the age of the cable in years.

Table 9 is an illustrative look-up table implemented function for a joint/termination type function.

TABLE 9

| Joint/Termination Type | f(JT-Type) |
|---|---|
| Normal Field Wrapping | 1 |
| Careful Field Wrapping | 0.8 |
| Normal Premold Technology | 0.6 |
| Careful Premold Technology | 0.4 |
| Normal Shrink Technology | 0.2 |
| Careful Shrink Technology | 0 |

Table 10 is an illustrative look-up table implemented function for a joint/termination maintenance function.

TABLE 10

| Joint/Termination Maintenance | f(JT-M) |
|---|---|
| No maintenance at all | 1 |
| Selected visual inspection | 0.75 |
| Regular visual inspection | 0.5 |
| Routine testing/maintenance | 0.25 |
| Extensive testing/maintenance | 0 |

A joint/termination function may be implemented with Equation 13:

$$f(JT)=1-\exp(-2.7726*f(JT\text{-}Type)*f(JT\text{-}M)) \quad \text{Equation 13}$$

where JT-Type is the joint/termination type and JT-M is the joint/termination maintenance.

Circuit Breakers

Table 11 shows illustrative transmission PCB outage statistics. Generally, outage statistics are reported by voltage classification and interrupting medium. Outage statistics are distinguished between subcomponent related interruptions and terminal equipment related interruptions. Failure rate is estimated by the Service Time Failure Rate, which is defined as the ratio of the total number of outages actually observed during a certain period of time and the total exposure time in component-years.

TABLE 11

Circuit Breaker Statistics Involving Integral Subcomponent

| Voltage Classification | Interrupting Medium | Integral Subcomponent | Outage Statistics | Asset Information |
|---|---|---|---|---|
| 60–109 | Bulk Oil | Bushing (Including CTs) | Number of Outages | Component Years |
| 110–149 | Minimum Oil | Operating Mechanisms | Frequency | |
| 150–199 | Air Blast | Interrupters | Total Time | |
| 200–299 | SF6 - Live Tank | Insulation System (Support Insulators) | Mean Duration | |
| 300–399 | SF6 - Dead Tank | Resistors or Grounding Capacitors | Median Duration | |
| 500–599 | Vacuum | Interrupting Medium | Unavailability | |
| 600–799 | All Interrupting Media | Auxiliary Equipment | | |
| | | Other | | |
| | | All Integral Subcomponents | | |

Circuit Breaker Statistics Involving Terminal Equipment

| Voltage Classification | Interrupting Medium | Terminal Equipment | Outage Statistics | Asset Information |
|---|---|---|---|---|
| 60–109 | Bulk Oil | Control & Protection Equipment | Number of Outages | Component Years |
| 110–149 | Minimum Oil | Surge Arrester | Frequency | |
| 150–199 | Air Blast | Bus | Total Time | |
| 200–299 | SF6 - Live Tank | Disconnect | Mean Duration | |
| 300–399 | SF6 - Dead Tank | Circuit Switcher | Median Duration | |
| 500–599 | Vacuum | Current Transformer | Unavailability | |
| 600–799 | All Interrupting Media | Potential Device | | |
| | | Other | | |
| | | Unknown | | |
| | | All Terminal Equipment | | |

Table 12 shows illustrative reliability data of 60 kV-149 kV PCBs in Canadian power networks, corresponding to a U.S. system (69~138 kV ratings). It can be seen that SF-6-Dead Tank and Air-Blast circuit breakers experienced higher failure rates than other types of PCBs. In this case, operating mechanisms, auxiliary equipment, and control & protection equipment are shown to be the main factors to the outages.

TABLE 12

| Interrupting Medium | Component Years | Subcomponent | Number of Outages | Frequency (per a) | Percentage (%) | Breaker Type |
|---|---|---|---|---|---|---|
| Bulk Oil | 10740.5 | Bushing (Including CTs) | 21 | 0.0020 | 3 | PCB_BO100 |
| | | Operating Mechanisms | 228 | 0.0212 | 31 | |
| | | Interruptors | 5 | 0.0005 | 1 | |
| | | Insulation System (Support Insulators) | 7 | 0.0007 | 1 | |
| | | Resistors or Grounding Capacitors | 0 | 0.0000 | 0 | |
| | | Interrupting Medium | 5 | 0.0005 | 1 | |
| | | Auxiliary Equipment | 95 | 0.0088 | 13 | |
| | | Other | 43 | 0.0040 | 6 | |
| | | Control and Protection Equipment | 327 | 0.0304 | 45 | |
| | | All Integral Subcomponents | 731 | 0.0681 | 100 | |
| Minimum Oil | 3993 | Bushing (Including CTs) | 2 | 0.0005 | 1 | PCB_MO100 |
| | | Operating Mechanisms | 55 | 0.0138 | 37 | |
| | | Interruptors | 1 | 0.0003 | 1 | |
| | | Insulation System (Support Insulators) | 11 | 0.0028 | 7 | |
| | | Resistors or Grounding Capacitors | 0 | 0.0000 | 0 | |
| | | Interrupting Medium | 16 | 0.0040 | 11 | |
| | | Auxiliary Equipment | 7 | 0.0018 | 5 | |
| | | Other | 5 | 0.0013 | 3 | |
| | | Control and Protection Equipment | 50 | 0.0125 | 34 | |
| | | All Integral Subcomponents | 147 | 0.0368 | 100 | |
| Air Blast | 2493 | Bushing (Including CTs) | 6 | 0.0024 | 2 | PCB_AB100 |
| | | Operating Mechanisms | 82 | 0.0329 | 34 | |
| | | Interruptors | 1 | 0.0004 | 0 | |
| | | Insulation System (Support Insulators) | 8 | 0.0032 | 3 | |
| | | Resistors or Grounding Capacitors | 2 | 0.0008 | 1 | |
| | | Interrupting Medium | 13 | 0.0052 | 5 | |
| | | Auxiliary Equipment | 21 | 0.0084 | 9 | |
| | | Other | 9 | 0.0036 | 4 | |
| | | Control and Protection Equipment | 101 | 0.0405 | 42 | |
| | | All Integral Subcomponents | 243 | 0.0975 | 100 | |
| SF6-Live Tank | 2792 | Bushing (Including CTs) | 1 | 0.0004 | 1 | PCB_SL100 |
| | | Operating Mechanisms | 8 | 0.0029 | 11 | |
| | | Interruptors | 0 | 0.0000 | 0 | |
| | | Insulation System (Support Insulators) | 10 | 0.0036 | 13 | |

TABLE 12-continued

| Interrupting Medium | Component Years | Subcomponent | Number of Outages | Frequency (per a) | Percentage (%) | Breaker Type |
|---|---|---|---|---|---|---|
| | | Resistors or Grounding Capacitors | 0 | 0.0000 | 0 | |
| | | Interrupting Medium | 4 | 0.0014 | 5 | |
| | | Auxiliary Equipment | 1 | 0.0004 | 1 | |
| | | Other | 0 | 0.0000 | 0 | |
| | | Control and Protection Equipment | 52 | 0.0186 | 68 | |
| | | All Integral Subcomponents | 76 | 0.0272 | 100 | |
| SF6-Dead Tank | 1471 | Bushing (Including CTs) | 1 | 0.0007 | 1 | PCB_SD100 |
| | | Operating Mechanisms | 28 | 0.0190 | 17 | |
| | | Interruptors | 0 | 0.0000 | 0 | |
| | | Insulation System (Support Insulators) | 25 | 0.0170 | 15 | |
| | | Resistors or Grounding Capacitors | 0 | 0.0000 | 0 | |
| | | Interrupting Medium | 16 | 0.0109 | 10 | |
| | | Auxiliary Equipment | 18 | 0.0122 | 11 | |
| | | Other | 13 | 0.0088 | 8 | |
| | | Control and Protection Equipment | 65 | 0.0442 | 39 | |
| | | All Integral Subcomponents | 166 | 0.1128 | 100 | |
| All Interupting Media | 21504.5 | Bushing (Including CTs) | 31 | 0.0014 | 2 | PCB_AM100 |
| | | Operating Mechanisms | 401 | 0.0186 | 29 | |
| | | Interruptors | 7 | 0.0003 | 1 | |
| | | Insulation System (Support Insulators) | 61 | 0.0028 | 4 | |
| | | Resistors or Grounding Capacitors | 2 | 0.0001 | 0 | |
| | | Interrupting Medium | 54 | 0.0025 | 4 | |
| | | Auxiliary Equipment | 142 | 0.0066 | 10 | |
| | | Other | 70 | 0.0033 | 5 | |
| | | Control and Protection Equipment | 595 | 0.0277 | 44 | |
| | | All Integral Subcomponents | 1363 | 0.0634 | 100 | |

Table 13 shows an illustrative list of features along with a proposed assessment criteria and value ranges. As shown, the feature of breaker type is used in the situation when the given outage statistics are aggregated for all types of interrupting medium, however, the feature of breaker type could be used in all cases.

TABLE 13

| Feature | Description | Assessment | Range |
|---|---|---|---|
| Age | In service years | <21 | 1 |
| | | 21–25 | 3 |
| | | 26–30 | 5 |
| | | 31–35 | 6 |
| | | 36–40 | 8 |
| | | >40 | 10 |
| Breaker type | Interrupting medium | SF6 - Live Tank | 1 |
| | | Minimum Oil | 3 |
| | | Bulk Oil | 5 |
| | | Other | 6 |
| | | SF6 - Dead Tank | 8 |
| | | Air Blast | 10 |
| Operation experience | Experienced operation problems | No failure or malfunction | 1 |
| | | Minor problems (i.e. leakage) | 6 |
| | | Failure caused by manufacturing problem | 10 |
| Breaking occurrence | Number of breaking operations per year | 0–1 | 1 |
| | | 2–5 | 6 |
| | | 6–10 | 10 |
| Switching occurrence | Number of switching operations per year | <50 | 1 |
| | | 50–100 | 6 |
| | | >100 | 10 |
| Driving mechanism | Mechanisms for opening and closing operation | Spring energy store | 1 |
| | | Hydraulic-spring | 4 |
| | | Hydraulic-N2 | 7 |
| | | Air | 10 |
| Maintenance | Months from last maintenance | <12 months | 1 |
| | | 13–18 months | 4 |
| | | 19–24 months | 7 |
| | | >24 months | 10 |
| Environment conditions | Air pollution, humidity, corrosion and vibration | No air pollution | 1 |
| | | Moderate air pollution | 6 |
| | | Heavy air pollution | 10 |
| Deviation of switching time | Deviation of switching time (open/close) from setpoint | <10% | 1 |
| | | 10–20% | 6 |
| | | >20% | 10 |
| Synchronism | Time difference of multi-phase switching operations | <2 ms | 1 |
| | | 2–4 ms | 4 |

TABLE 13-continued

| Feature | Description | Assessment | Range |
|---|---|---|---|
| | | 5–7 ms | 7 |
| | | >7 ms | 10 |
| Deviation of contact travel | Deviation of contact travel from reference value | No deviation | 1 |
| | | Minor deviation (within tolerable limits) | 6 |
| | | Immediate action required | 10 |
| Gas/Oil analysis | Deviation from nominal value | Better than nominal value | 1 |
| | | Nominal value met | 6 |
| | | Exceeds tolerable limit | 10 |
| Operation time of driving motor | Operation time of driving motor related to reference value | <10% | 1 |
| | | 10–20% | 4 |
| | | 21–30% | 7 |
| | | >30% | 10 |
| Motor drive | Tolerance of wear and tear | OK | 1 |
| | | Tolerable wear and tear | 6 |
| | | Intolerable wear and tear (e.g. frequent replacing of seals) | 10 |
| Control and auxiliary circuits | Insulation, labeling, and relay testing | OK | 1 |
| | | Minor problems | 6 |
| | | Missing labeling, weak insulation, failing relays | 10 |
| Arcing chamber | Flange corrosion, damaged porcelain and terminal hot spots, leaks | OK | 1 |
| | | Minor problems | 6 |
| | | Flange corrosion, damaged porcelain, terminal hot spots, leaks | 10 |

Table 14 shows an illustrative list of mapping functions in weighted sum forms. For example, the failure rate associated with auxiliary equipment may be related to three features: breaker type, maintenance and environmental condition. According to Equation 4, the composite per-unit factor value for auxiliary equipment can then be determined by the following calculation in Equation 14, where $NSF_1$, $NSF_7$, and $NSF_8$ are the assessed feature values for a particular PCB and $NSF_{1\text{-}max}$, $NSF_{7\text{-}max}$, and $NSF_{8\text{-}max}$ are the maximum feature values defined in Table 13. Multiplier $W_{SF}$ (default value of $W_{SF}$ is one) may be used to adjust the obtained failure rate such that the PCB reliability data set generated is consistent with the given system outage statistics.

$$CF_7 = W_{SF} \frac{0.5 \times NSF_1 + 0.3 \times NSF_7 + 0.2 \times NSF_8}{0.5 \times NSF_{1-\max} + 0.3 \times NSF_{7-\max} + 0.2 \times NSF_{8-\max}} \quad \text{Equation 13}$$

TABLE 14

| | SF1 | SF2 | SF3 | SF4 | SF5 | SF6 | SF7 | SF8 | SF9 | SF10 | SF11 | SF12 | SF13 | SF14 | SF15 | SF16 |
|---|---|---|---|---|---|---|---|---|---|---|---|---|---|---|---|---|
| F1 | 0.5 | | | | | | | 0.5 | | | | | | | | |
| F2 | | | 0.2 | 0.2 | | 0.1 | 0.1 | | | 0.1 | 0.1 | | | 0.1 | 0.1 | |
| F3 | | | 0.3 | 0.2 | 0.1 | | | | | 0.1 | 0.2 | 0.1 | | | | |
| F4 | | | 0.3 | 0.2 | 0.1 | | | 0.2 | | | | | 0.2 | | | |
| F5 | 0.5 | | 0.3 | | | | | 0.2 | | | | | | | | |
| F6 | | 0.2 | | 0.2 | 0.1 | | | | | | | | 0.2 | | | 0.3 |
| F7 | 0.5 | | | | | | 0.3 | 0.2 | | | | | | | | |
| F8 | 0.5 | | | | | | 0.3 | 0.2 | | | | | | | | |
| F9 | 0.3 | | | | | | 0.2 | | | | | | | | 0.5 | |

F1 Bushing (Including CTs)
F2 Operating Mechanisms
F3 Interrupters
F4 Insulation System (Support Insulators)
F5 Resistors or Grounding Capacitors
F6 Interrupting Medium
F7 Auxiliary Equipment
F8 Other
F9 Control and Protection Equipment
SF2 Breaker type
SF3 Operation experience
SF4 Breaking occurrence
SF5 Switching occurrence
SF6 Driving mechanism
SF7 Maintenance
SF8 Environment conditions
SF9 Deviation of switching time
SF10 Synchronism
SF11 Deviation of contact travel
SF12 Gas/oil analysis
SF13 Operation time of driving motor
SF14 Motor drive
SF15 Control and auxiliary circuits
SF16 Arcing chamber FIG. 13 shows an illustrative spreadsheet model for PCB failure rate estimation. The lognormal cumulative distribution function may be used for mapping the composite per-unit factor values to factor-related failure rates. The user may also define an appropriate value range of multipliers under certain confidence level, say 95%. The value range may be set at 0~3.5 which means the estimated failure rate for an individual PCB would be anywhere from zero to three and half times of the average system failure rate value depending on the assessment of condition-related features.

Overhead Lines

Table 15 shows an illustrative industry report on overhead line (OHL) outage statistics by primary causes of interruptions. As shown, outage statistics are reported by primary causes of interruptions, including intrinsic factors, external factors and human error factors. Each primary cause may be further decomposed if detailed information is available from a utility outage management system (OMS). The failure rate may be estimated by the Service Time Failure Rate, which is defined as the ratio of the total number of outages actually observed during a certain period of time and the total exposure time in mile-years.

TABLE 15

| Primary Cause | # of Outages | Frequency (per mile, a) | Percentage (%) |
|---|---|---|---|
| TXU OMS Statistics | | | |
| Equipment | 768 | 0.8649 | 27 |
| Foreign Object | 372 | 0.4189 | 13 |
| Human Error | 49 | 0.0552 | 2 |
| Lightning | 282 | 0.3176 | 10 |
| Other | 696 | 0.7838 | 24 |
| Tree Contact | 537 | 0.6047 | 19 |
| Unknown | 185 | 0.2083 | 6 |
| Weather | 0 | 0.0000 | 0 |
| Total | 2889 | 3.2534 | 100 |
| Total Dist OHL miles | 296 | | |
| Study years | 3 | | |
| Total mile-years | 888 | | |
| SDG&E OMS Statistics | | | |
| Equipment | 562 | 0.0513 | 26 |
| Foreign Object | 153 | 0.0140 | 7 |
| Human Error | 169 | 0.0154 | 8 |
| Lightning | 98 | 0.0090 | 5 |
| Other | 70 | 0.0064 | 3 |
| Tree Contact | 289 | 0.0264 | 13 |
| Unknown | 284 | 0.0259 | 13 |
| Weather | 544 | 0.0497 | 25 |
| Total | 2169 | 0.1981 | 100 |
| Total Dist OHL miles | 1564 | | |
| Study years | 7 | | |
| Total mile-years | 10948 | | |

Table 16 shows an illustrative list of features along with a proposed assessment criteria and corresponding value ranges.

TABLE 16

| Feature | Description | Assessment | Range |
|---|---|---|---|
| Age | In-service years | <21 | 1 |
| | | 21~25 | 3 |
| | | 26~30 | 5 |
| | | 31~35 | 6 |
| | | 36~40 | 8 |
| | | >40 | 10 |
| Animal population | Animal population relative to national/regional average | Little | 1 |
| | | Below Normal | 3 |
| | | Normal | 5 |
| | | Above Normal | 8 |
| | | Excessive | 10 |
| Animal guards | Installation of proper animal guards | None | 10 |
| | | Some Sort of | 7 |
| | | Standard | 4 |
| | | Extensive | 1 |
| OHL location | | Metropolitan | 1 |
| | | Suburb | 2 |
| | | Small Town | 3 |
| | | Rural Area | 4 |
| | | Wooden Area | 5 |
| OHL shielding | | Not at all | 10 |
| | | Partly | 8 |
| | | Moderately | 5 |
| | | Heavily | 3 |
| | | Fully | 1 |
| Lightning protection | Installation of surge arresters | None | 10 |
| | | Some Sort of | 8 |
| | | Standard | 5 |
| | | Good | 3 |
| | | Excellent | 1 |
| Tree density | Number of conflicting trees per mile | 0~5 | 1 |
| | | 6~15 | 3 |
| | | 15~30 | 5 |
| | | 31~50 | 8 |
| | | >50 | 10 |

TABLE 16-continued

| Feature | Description | Assessment | Range |
|---|---|---|---|
| Tree trimming | Months from last tree trimming | <12 months | 1 |
| | | 12~24 months | 4 |
| | | 25~36 months | 7 |
| | | >36 months | 10 |
| Conductor size | Outer diameter in inches | >0.2 | 10 |
| | | 0.2~0.5 | 7 |
| | | 0.6~0.9 | 4 |
| | | >1.0 | 1 |
| Spacing of conductors | Conductor spacing to withstand adverse wind- or ice-loading conditions | No problems | 1 |
| | | Design standards met | 4 |
| | | Inadequate (minor) | 7 |
| | | Inadequate (significant) | 10 |
| Pole and structure | Strength and foundation | No problems | 1 |
| | | Design standards met | 4 |
| | | Inadequate (minor) | 7 |
| | | Inadequate (significant) | 10 |
| Barriers | Installation of barriers | None | 10 |
| | | Some Sort of | 7 |
| | | Standard | 4 |
| | | Extensive | 1 |
| Environment conditions | Air pollution, humidity, corrosion and vibration | No air pollution | 1 |
| | | Moderate air pollution | 6 |
| | | Heavy air pollution | 10 |
| O&M experience | System O&M staff working experience | Not good | 10 |
| | | Good | 6 |
| | | Excellent | 1 |

Table 17 shows an illustrative list of mapping functions in the weighted sum forms. For example, the failure rate associated with tree contact may be related to three features: tree density, tree trimming and conductor size. According to Equation 14, the composite per-unit factor value for tree contact can then be determined by the following calculation, where $NSF_8$, $NSF_9$, and $NSF_{10}$ are the assessed feature values for a particular OHL segment and $NSF_{8\text{-}max}$, $NSF_{9\text{-}max}$, and $NSF_{10\text{-}max}$ are the maximum feature values defined in Table 16. Multiplier $W_{SF}$ (default value of $W_{SF}$ is one) may be used to adjust the obtained failure rate such that the OHL reliability data set generated is consistent with the given system outage statistics.

$$CF_6 = W_{SF} \frac{0.4 \times NSF_8 + 0.4 \times NSF_9 + 0.2 \times NSF_{10}}{0.4 \times NSF_{8\text{-max}} + 0.4 \times NSF_{9\text{-max}} + 0.2 \times NSF_{10\text{-max}}} \quad \text{Equation 14}$$

TABLE 17

| | SF1 | SF2 | SF3 | SF4 | SF5 | SF6 | SF7 | SF8 | SF9 | SF10 | SF11 | SF12 | SF13 | SF14 |
|---|---|---|---|---|---|---|---|---|---|---|---|---|---|---|
| F1 | 0.5 | | | | | | | | | | 0.2 | | 0.3 | |
| F2 | | 0.3 | 0.4 | 0.3 | | | | | | | | | | |
| F3 | | | | | | | | | | | 0.2 | 0.3 | | 0.5 |
| F4 | | | | 0.4 | 0.4 | 0.2 | | | | | | | | |
| F5 | 0.5 | | | | | | | | | | | | 0.5 | |
| F6 | | | | | | | 0.4 | 0.4 | 0.2 | | | | | |
| F7 | 0.5 | | | | | | | | | | | | 0.5 | |
| F8 | | | | | | | | | 0.2 | 0.3 | 0.5 | | | |

F1 Equipment
F2 Foreign Object
F3 Human Error
F4 Lightning
F5 Other
F6 Tree Contact
F7 Unknown
F8 Weather
SF1 Age
SF2 Animal population
SF3 Animal guards
SF4 OHL location
SF5 OHL shielding
SF6 Lightning protection
SF7 Tree density
SF8 Tree trimming
SF9 Conductor size
SF10 Spacing of conductors
SF11 Pole and structure
SF12 Barriers
SF13 Environment conditions
SF14 O&M experience FIGS. 14a and 14b show an illustrative spreadsheet model for OHL failure rate estimation. As with the PCB failure rate estimation model, the lognormal cumulative distribution function is used for mapping the composite per-unit factor values to factor-related failure rates. The evaluated failure rate in FIG. 14a corresponds to typical or average system condition-related feature values while the evaluated failure rate in FIG. 14b corresponds to a set of worse condition-related feature values.

Lightning Effects on Overhead Lines

The total failure rate of an overhead line due to lightning may be given by (number of failures per 100 km per year):

$$N = N_{direct-hit} + N_{induced} \quad \text{Equation 15}$$

The number of direct hit faults on overhead lines without shielding wire may be given by $$N_{direct-hit} = N_d(1-S_f) \quad \text{Equation 16}$$

where $S_f$ is the shielding factor of the line ($S_f$ is affected by nearby trees, buildings, relative altitude of the line, etc.), $N_d$ is the flash collection rate of a line in open ground areas (no significant trees and buildings nearby). $N_d$ may be given by:

$$N_d = N_g \left( \frac{28h^{0.6} + b}{10} \right) [\text{failures}/100 \text{ km/yr}] \quad \text{Equation 17}$$

where h is the pole height (m), b is the structure width (m), and $N_g$ is the ground flash density (GFD) of lightning [flashes/km$^2$/yr]. $N_g$ may be calculated using the following two equations:

$$N_g = 0.04 T_d^{1.25} \quad \text{Equation 18}$$

$$\text{or } N_g = 0.054 T_h^{1.1} \quad \text{Equation 19}$$

where $T_d$ is the keraunic level (number of thunderstorm days per year) of the region (which may be obtained from the national weather center), $T_h$ is the number of thunderstorm hours per year (which may be obtained from national lightning detection network data for a particular region if enough years of data are available).

Figure 15:
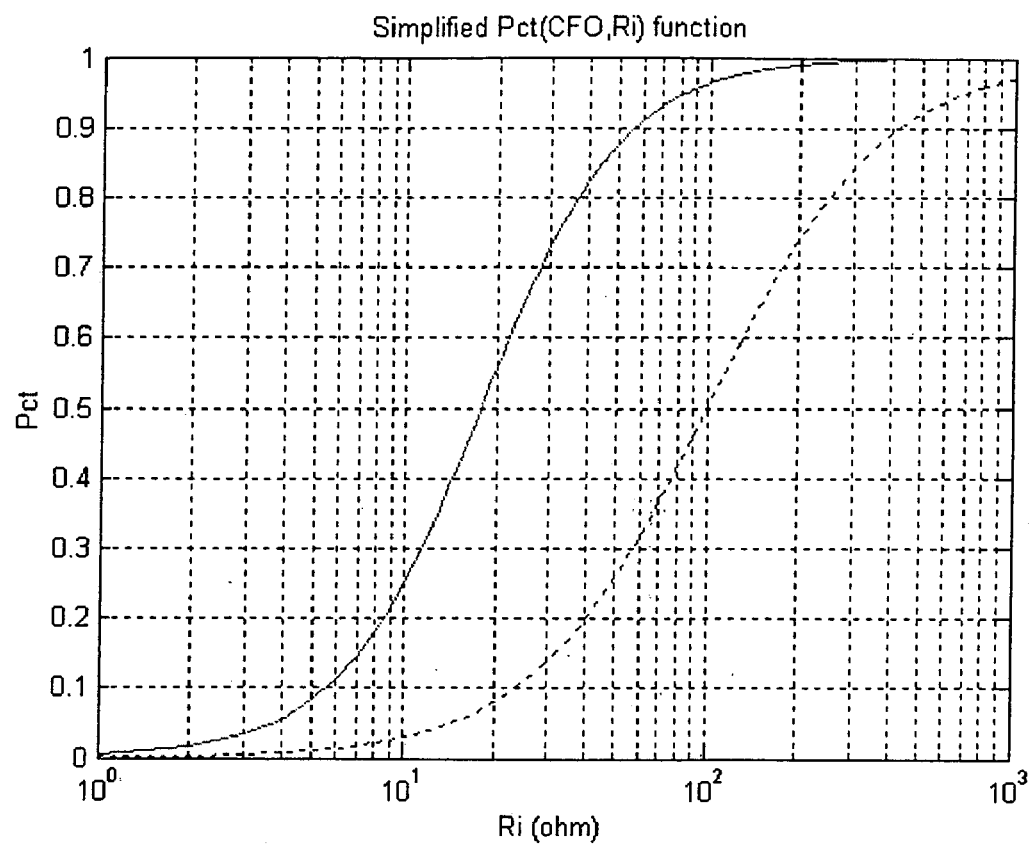
FIG. 15 is a diagram of an illustrative function for adjustment of a failure rate of an overhead line due to lightning in accordance with an embodiment of the invention.

For lines with shielding wire, if the shielding angle is smaller than a particular value (45° for lines less than 15 m tall with conductor spacing under 2 m, refer to IEEE Std 1243-1997 otherwise), all direct hits are assumed to terminate on the shielding wire and the direct-hit flashovers:

$$N_{direct-hit-flashover} = N_{direct-hit} * Pct(CFO, R_i) \quad \text{Equation 20}$$

where Pct is the percentage of direct-hits caused flashovers. It is a function of the critical impulse flashover voltage (CFO) and the pole footing resistance (shielding wires are assumed to be grounded at every pole). A shield-wire modeling process may be used to obtain Pct(CFO, $R_i$), which may be simplified using the following logistic function:

$$Pct(CFO, R_i) = \frac{1}{1 + \exp[-a(CFO) * (\log_{10}[R_i / R_{io}(CFO)])]} \quad \text{Equation 21}$$

where a and $R_{io}$ are functions of CFO. Illustrative Pct function are given in FIG. 15, where one curve corresponds to CFO=175 kV, a=4.375 and Rio=19, and the other curve corresponds to CFO=350 kV, a=3.5 and Rio=100. The curves are very similar to the curves given in IEEE Std 1410-1997

Figure 16:
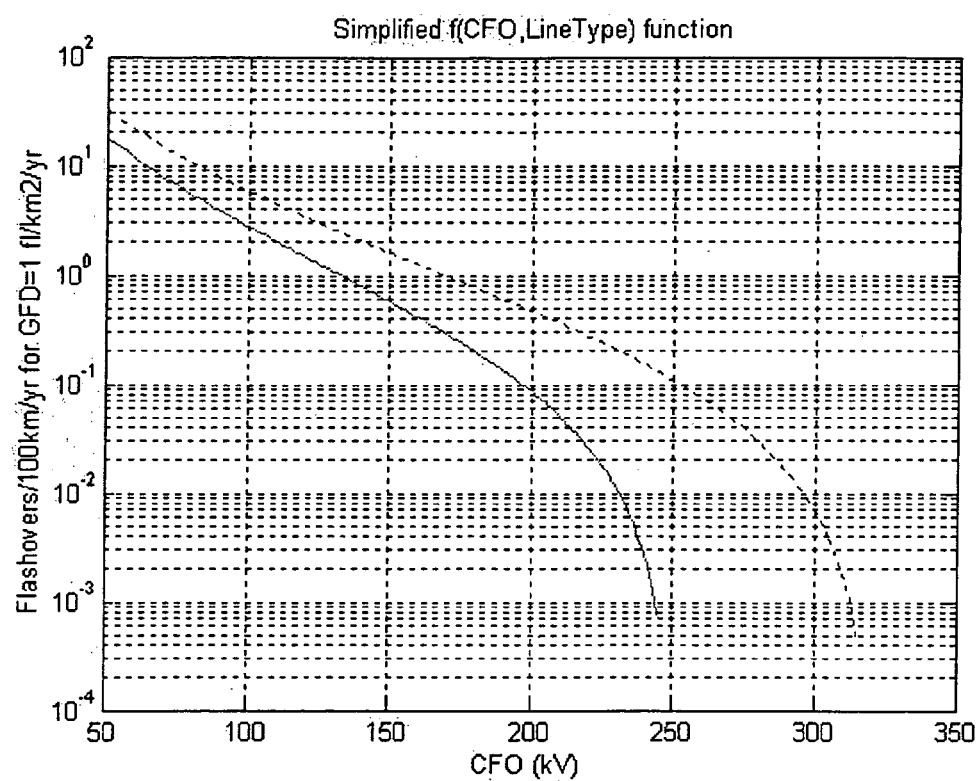
FIG. 16 is a diagram of another illustrative function for adjustment of a failure rate of an overhead line due to lightning in accordance with an embodiment of the invention.

The number of induced flashover faults in lines in open ground (i.e., the shielding factor of the line is 0) may be given by:

$$N_{induced} = GFD * f(CFO, \text{LineType}) \quad \text{Equation 22}$$

where LineType is "Ungrounded line" or "Line with a grounded neutral or shield wire". A curve set in IEEE Std 1410-1997 represents the function in Equation 22. Again, this set may be simplified using the following logistic function:

$$f(CFO, \text{LineType}) = 10^{0.84 e^{A(\text{LineType})/CFO - 1} + 0.1} \quad \text{Equation 23}$$

where A is a constant for each type of line. For "Ungrounded line," A(LineType)=320; for "Line with a grounded neutral or shield wire," A(LineType)=250. Equation 23 may be represented in FIG. 16 where the one curve corresponds to the "Ungrounded line" and the other curve corresponds to "Line with a grounded neutral or shield wire."

For lines with a shielding factor ($S_f \neq 0$), the number of flashovers is in the range between $N_{induced}$ calculated from Equation 22 and $N_d$ calculated from Equation 17. The user may decide which equation to use, or a simple FIS may be used to decide based on a user specification (e.g., conservative/moderate/aggressive).

Failure Rate Model Tuning

The model for determining an adjusted failure rate may be tuned to provide more accurate results over time. For example, the model may be tuned such that the estimated component reliability data attempts to match the historical outage distribution either by primary causes or by subcomponents as appropriate or as desired by the user. Furthermore, the component reliability data could be adjusted such that the calculated system reliability index SAIFI matches the historical system reliability index SAIFI allocated to a particular type of component.

Figure 9:
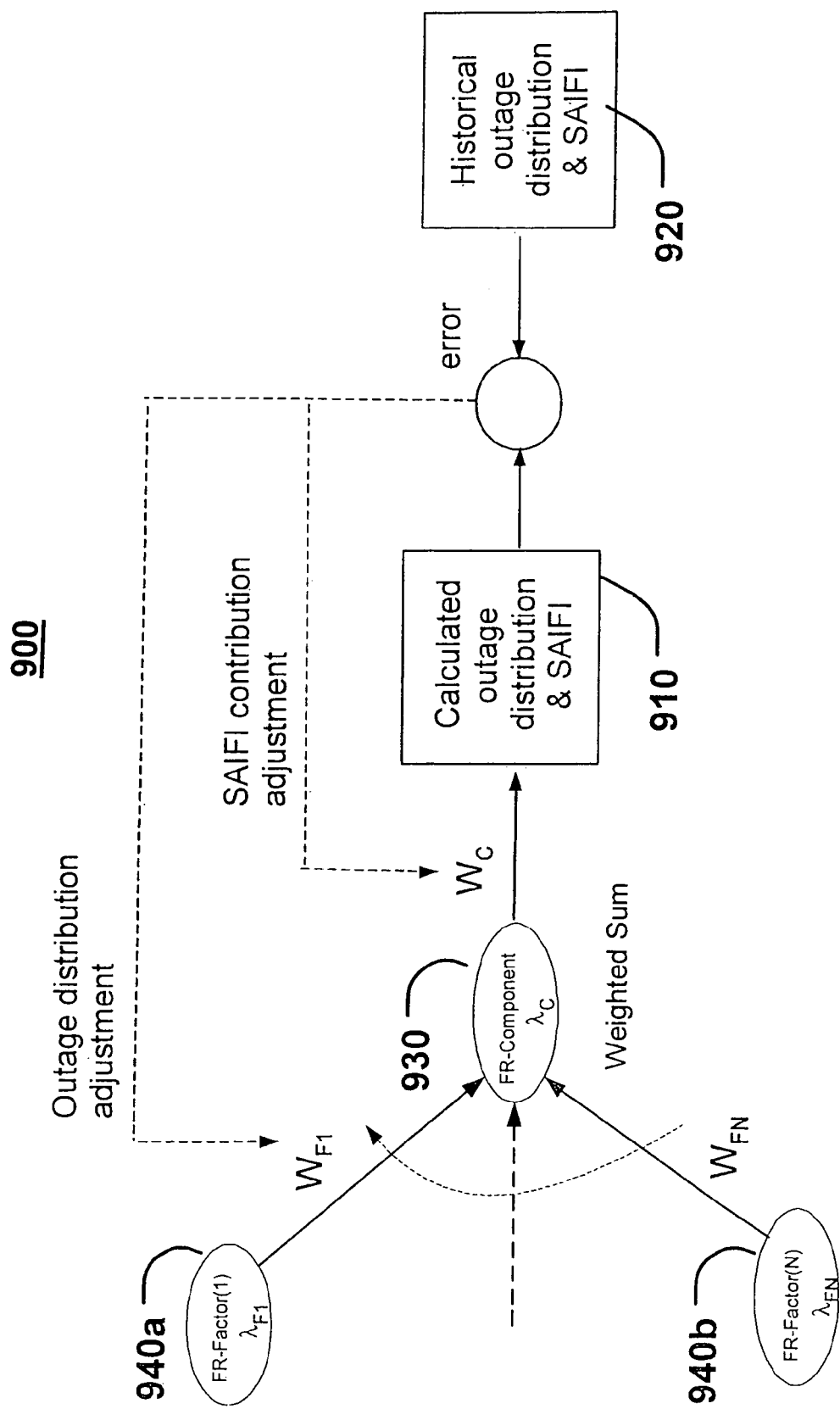
FIG. 9 is a diagram of an illustrative system for modifying weights of a failure rate adjustment system based on historical data in accordance with an embodiment of the invention.

FIG. 9 is a diagram of an illustrative system 900 showing the concept of failure rate model tuning. The following equations provide an embodiment for tuning the failure rate model to match historical outage cause distribution and SAIFI contribution statistics. The outage distribution adjustment may be calculated in accordance with Equation 24:

$$\text{Outage\_Distribution}_{calculated} = \text{Outage\_Distribution}_{Historical} \quad \text{Equation 24}$$

The SAIFI contribution adjustment may be calculated according to Equation 25:

$$\text{SAIFI\_Contribution}_{calculated} = \text{SAIFI\_Contribution}_{Historical} \quad \text{Equation 25}$$

To determine the outage distribution adjustment, the average component failure rates are calculated, both factor-related and component-aggregate, as well as the percentage contributions of factor-related failure rates to the component-aggregate failure rate. The value of factor-related multiplier $W_F$ for each factor is determined, which is defined as the ratio of historical percentage contribution (from historical outage distribution and SAIFI 920) to the calculated percentage contribution (from calculated outage distribution and SAIFI 910). The factor-related failure rate ($\lambda_F$) 940a, 940b associated with each individual component is multiplied by the calculated factor-related multiplier, $W_F$. The value of component multiplier $W_C$ is determined, which is defined as the ratio of historical average system failure rate (from historical outage distribution and SAIFI 920) to the calculated average system failure rate (from calculated outage distribution and SAIFI 910). The component failure rate ($\lambda_C$) associated with each individual component is multiplied by the calculated component multiplier, $W_C$. Note that the outage distribution adjustment is performed after completing the component failure rate estimation to adjust the resulting component reliability data set, in terms of outage distribution pattern and average system failure rate value, so that the historically experienced outage statistics are satisfied.

To determine the SAIFI contribution adjustment, the SAIFI indices may be calculated via network reliability assessment simulation using the component failure rates obtained from the failure rate estimation model. They may not match the actual system reliability indices, even though the average system failure rate can be tuned consistent with historical data. The calculation of SAIFI involves the number of customers interrupted by the component outages, a factor that is independent of the component failure rate. A simple way is to further adjust the component multiplier $W_C$, is scaling up or down based on the ratio of historical SAIFI contribution to the simulated SAIFI contribution.

The features used as inputs to the models illustrate an embodiment using information that might be available from utility engineers. As far as the information that is actually available, this may be determined through the application of these models in consulting cases. The types of information available are expected to vary between utilities. However through experience, it is desired to identify various data set input "types" ranging from minimum data available to what would be available if more extensive component monitoring were in place. Once the desired feature sets are established, the failure rate models may be modified to accommodate this.

The component reliability models developed may be largely based on literature reviews, other models may be based also on domain experts with extensive field experience, especially for transformer and cable models. The models may be developed as a web application that could be used in a web-based environment.

Reliability Assessment

Once the model has been developed to modify the component failure rate, various types of reliability assessment activities can be performed. For example, using the maintenance simulation and the fault simulation information as described above, a reliability assessment may be determined using conventional reliability assessment techniques. As was described above, any fault or maintenance can contribute to the outage frequency and outage duration of a component. Modeling the faulting and maintaining of components within the power network with a specific FR, MTTR, MF, and MDs and simulating a fault and maintenance results in each component's total contribution to outage frequency and duration to every other component in the system. In this manner, conventional reliability assessment systems may be easily integrated with the adjusted failure rate to provide more realistic reliability assessment while leveraging the existing base of conventional reliability assessment systems.

Conclusion

In sum, the invention provides a system and method to adjust conventional failure rates to account for the condition of the particular power network component. Once the failure rate is adjusted, the adjusted failure rate can be used by conventional reliability assessment systems.

The invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of explanation and are in no way to be construed as limiting of the invention. While the invention has been described with reference to illustrative embodiments, it is understood that the words which have been used herein are words of description and illustration, rather than words of limitations. Further, although the invention has been described herein with reference to particular structures, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A method for providing a reliability assessment of a power network, the method comprising:

providing a display device;

determining information representative of a failure rate of a power network component based on a population of power network components of the same type as the power network component;

receiving information representative of the condition of the power network component; and determining an adjusted failure rate for the power network component based on the information representative of the failure rate of the power network component and the information representative of the condition of the power network component, wherein determining the adjusted failure rate for the power network component comprises:

converting the information representative of the condition of the power network component into an adjustment index; and converting the adjustment index into the adjusted failure rate using the information representative of the failure rate of the power network component; and displaying adjusted failure rate on the display device.

2. The method as recited in claim 1, wherein determining the information representative of a failure rate of a power network component comprises receiving a failure rate from a data store containing failure rates of a plurality of power network components, wherein the failure rate for each power network component is based on a population of power network components of the same type as the power network component.

3. The method as recited in claim 1, wherein determining the information representative of a failure rate of a power network component comprises determining a failure rate by processing historical power network component failure data for a plurality of power network components of the same type as the power network component.

4. The method as recited in claim 1, wherein receiving the information representative of the condition of the power network component comprises receiving one of the age of the power network component, information representative of maintenance performed on the power network component, information representative of preventative maintenance performed on the power network component, information representative of the environment of the power network component, information representative of the operating conditions of the power network component.

5. The method as recited in claim 1, wherein converting the information representative of the condition of the power network component into an adjustment index comprises transforming a condition feature (x) of the power network component using a single-input, single-output (SISO) function, wherein the SISO function is selected from the group consisting of a linear function having the form $f(x)=Ax+B$, a power function having the form $f(x)=A(x^B)$, a first exponential function having the form $f(x)=A[\exp(-Bx)]$, a second exponential function having the form $f(x)=A[1-\exp(-Bx)]$ and a logistic function having the form $f(x)=A/[1+\exp(-Bx)]$.

6. The method as recited in claim 1, wherein the step of determining information representative of the failure rate of the power network component comprises determining a cumulative distribution function (CDF) from historical power network component failure data for a plurality of power network components of the same type as the power network component, and wherein the step of converting the adjustment index into the adjusted failure rate comprises mapping the adjustment index into the adjusted failure rate using the CDF.

7. The method as recited in claim 1, wherein determining the adjusted failure rate for the power network component comprises:
    determining a plurality of subcomponents contributing to the failure rate of the power network component;
    for each subcomponent, determining information representative of a failure rate of the subcomponent based on a population of subcomponents of the same type as the subcomponent;
    determining information representative of the condition of each subcomponent;
    for each subcomponent, converting the corresponding information representative of the condition of the subcomponent into an adjustment index;
    for each subcomponent, converting the corresponding adjustment index into an adjusted failure rate for the subcomponent using the information representative of the failure rate of the subcomponent; and
    combining the adjusted failure rates for the subcomponents to produce the adjusted failure rate for the power network component.

8. The method as recited in claim 7, wherein for each subcomponent, converting the corresponding information representative of the condition of the subcomponent into an adjustment index comprises transforming a condition feature (x) of the subcomponent using a single-input, single-output (SISO) function, wherein the SISO function is selected from the group consisting of a linear function having the form $f(x)=Ax+B$, a power function having the form $f(x)=A(x^B)$, a first exponential function having the form $f(x)=A[\exp(-Bx)]$, a second exponential function having the form $f(x)=A[1-\exp(-Bx)]$ and a logistic function having the form $f(x)=A/[1+\exp(-Bx)]$.

9. The method as recited in claim 7, wherein for each subcomponent, the step of determining information representative of a failure rate of the subcomponent comprises determining a cumulative distribution function (CDF) from historical subcomponent failure data for a plurality of suboomponents of the same type as the subcomponent, and wherein for each subcomponent, converting the corresponding adjustment index into the adjusted failure rate comprises mapping the corresponding adjustment index into the adjusted failure rate using the CDF for the subcomponent.

10. The method of claim 1, wherein the adjustment index is a combined adjustment index, and the information representative of the condition of the power network component comprises a plurality of condition features, and wherein the step of converting the information representative of the condition of the power network component comprises:
    converting each condition feature into a condition feature adjustment index; and
    combining the condition feature adjustment indices so as to form the combined adjustment index.

11. The method of claim 10, wherein each condition feature is selected from the group consisting of the age of the power network component, information representative of maintenance performed on the power network component, information representative of preventative maintenance performed on the power network component, information representative of the environment of the power network component, and information representative of the operating conditions of the power network component.

12. A reliability assessment system for a power network, the reliability assessment system comprising:
    a first data store comprising:
        information representative of a failure rate of a power network component based on a population of power network components of the same type as the power network component; and
        information representative of the condition of the power network component; and
    a computing application cooperating with the first data store and performing:
        receiving the information representative of a failure rate of a power network component based on a population of power network components of the same type as the power network component from the first data store;
        receiving the information representative of the condition of the power network component from the first data store; and
        determining an adjusted failure rate for the power network component based on the information representative of the failure rate of the power network component and the information representative of the condition of the power network component, wherein determining the adjusted failure rate for the power network component comprises:
            converting the information representative of the condition of the power network component into an adjustment index; and converting the adjustment index into the adjusted failure rate using the information representative of the failure rate of the power network component.

13. The system as recited in claim 12, wherein receiving the information representative of the condition of the power network component comprises receiving one of the age of the power network component, information representative of maintenance performed on the power network component, information representative of preventative maintenance performed on the power network component, information representative of the environment of the power network component, information representative of the operating conditions of the power network component.

14. The system as recited in claim 12, wherein converting the information representative of the condition of the power network component into an adjustment index comprises transforming a condition feature (x) of the power network component using a single-input, single-output (SISO) function, wherein the SISO function is selected from the group consisting of a linear function having the form f(x)=Ax+B, a power function having the form f(x)=A(x^B), a first exponential function having the form f(x)=A[exp(-Bx)], a second exponential function having the form f(x)=A[1-exp(-Bx)] and a logistic function having the form f(x)=A/[1+exp(-Bx)].

15. The system as recited in claim 12, wherein the step of determining information representative of the failure rate of the power network component comprises determining a cumulative distribution function (CDF) from historical power network component failure data for a plurality of power network components of the same type as the power network component, and wherein the step of converting the adjustment index into the adjusted failure rate comprises mapping the adjustment index into the adjusted failure rate using the CDF.

16. The system as recited in claim 12, wherein determining the adjusted failure rate for the power network component comprises:
   determining a plurality of subcomponents contributing to the failure rate of the power network component;
   for each subcomponent, determining information representative of a failure rate of the subcomponent based on a population of subcomponents of the same type as the subcomponent;
   determining information representative of the condition of each subcomponent;
   for each subcomponent, converting the corresponding information representative of the condition of the subcomponent into an adjustment index;
   for each subcomponent, converting the corresponding adjustment index into an adjusted failure rate for the subcomponent using the information representative of the failure rate of the subcomponent; and
   combining the adjusted failure rates for the subcomponents to produce the adjusted failure rate for the power network component.

17. The system as recited in claim 16, wherein for each subcomponent, converting the corresponding information representative of the condition of the subcomponent into an adjustment index comprises transforming a condition feature (x) of the subcomponent using a single-input, single-output (SISO) function, wherein the SISO function is selected from the group consisting of a linear function having the form f(x)=Ax+B, a power function having the form f(x)=A(x^B), a first exponential function having the form f(x)=A[exp(-Bx)], a second exponential function having the form f(x)=A[1-exp(-Bx)] and a logistic function having the form f(x)=A/[1+exp(-Bx)].

18. The system as recited in claim 16, wherein for each subcomponent, the step of determining information representative of a failure rate of the subcomponent comprises determining a cumulative distribution function (CDF) from historical subcomponent failure data for a plurality of subcomponents of the same type as the subcomponent, and wherein for each subcomponent, converting the corresponding adjustment index into the adjusted failure rate comprises mapping the corresponding adjustment index into the adjusted failure rate using the CDF for the subcomponent.

19. The reliability assessment system of claim 12, wherein the adjustment index is a combined adjustment index, and the Information representative of the condition of the power network component comprises a plurality of condition features, and wherein converting the information representative of the condition of the power network component comprises:
   converting each condition feature into a condition feature adjustment index; and
   combining the condition feature adjustment indices so as to form the combined adjustment index.

20. The reliability assessment system of claim 19, wherein each condition feature is selected from the group consisting of the age of the power network component, information representative of maintenance performed on the power network component, information representative of preventative maintenance performed on the power network component, information representative of the environment of the power network component, and information representative of the operating conditions of the power network component.

* * * * *